United States Patent
Espiau et al.

(10) Patent No.: US 7,498,747 B2
(45) Date of Patent: *Mar. 3, 2009

(54) PLASMA LAMP WITH DIELECTRIC WAVEGUIDE

(75) Inventors: Frederick M. Espiau, Topanga, CA (US); Chandrashekhar J. Joshi, Santa Monica, CA (US); Yian Chang, Los Angeles, CA (US)

(73) Assignee: Luxim Corporation, Sunnyvale, CA (US)

( * ) Notice: Subject to any disclaimer, the term of this patent is extended or adjusted under 35 U.S.C. 154(b) by 546 days.

This patent is subject to a terminal disclaimer.

(21) Appl. No.: 11/083,558

(22) Filed: Mar. 18, 2005

(65) Prior Publication Data

US 2007/0001614 A1    Jan. 4, 2007

Related U.S. Application Data

(63) Continuation of application No. 10/771,788, filed on Feb. 4, 2004, now Pat. No. 7,348,732, which is a continuation of application No. 09/809,718, filed on Mar. 15, 2001, now Pat. No. 6,737,809.

(60) Provisional application No. 60/222,028, filed on Jul. 31, 2000.

(51) Int. Cl.
*H05B 37/00* (2006.01)
(52) U.S. Cl. .................... 315/39; 315/248; 313/634; 313/636
(58) Field of Classification Search ............. 315/39, 315/248; 313/634, 636
See application file for complete search history.

(56) References Cited

U.S. PATENT DOCUMENTS

| | | | |
|---|---|---|---|
| 3,179,213 A | 4/1965 | Kuelme et al. | |
| 3,641,389 A | 2/1972 | Leidigh | |
| 3,787,705 A | 1/1974 | Bolin et al. | |
| 3,826,950 A | 7/1974 | Hruda et al. | |
| 3,860,854 A | 1/1975 | Hollister | |
| 3,942,058 A | 3/1976 | Haugsjaa et al. | |
| 3,943,401 A | 3/1976 | Haugsjaa et al. | |
| 3,993,927 A | 11/1976 | Haugsjaa et al. | |
| 4,001,631 A | 1/1977 | McNeill et al. | |

(Continued)

FOREIGN PATENT DOCUMENTS

DE    195 32 780 A1    3/1997

(Continued)

OTHER PUBLICATIONS

"E-mail from Morgan to Pisano", *Exhibit 2260, Guthrie v. Espiau, Patent Interference 105,393*, (Oct. 8, 2007), 1 pg.

(Continued)

*Primary Examiner*—David Hung Vu
(74) *Attorney, Agent, or Firm*—Schwegman, Lundberg & Woessner, P.A.

(57) ABSTRACT

A dielectric waveguide integrated plasma lamp is disclosed for powering a small and bright bulb with a diameter of a few millimeters. The lamp is contained within a high dielectric constant material which guides the microwaves to the bulb, provides heat isolation to the drive circuit, contains the microwaves, provides structural stability and ease of manufacturing and allows efficient energy coupling to the bulb when used as a dielectric resonant oscillator.

16 Claims, 7 Drawing Sheets

U.S. PATENT DOCUMENTS

| | | | |
|---|---|---|---|
| 4,041,352 A | 8/1977 | McNeill et al. |
| 4,053,814 A | 10/1977 | Regan et al. |
| 4,206,387 A | 6/1980 | Kramer et al. |
| 4,359,668 A | 11/1982 | Ury |
| 4,485,332 A | 11/1984 | Ury et al. |
| 4,498,029 A | 2/1985 | Yoshizawa et al. |
| 4,504,768 A | 3/1985 | Ury et al. |
| 4,507,587 A | 3/1985 | Wood et al. |
| 4,507,597 A | 3/1985 | Trost |
| 4,607,242 A | 8/1986 | Cozzie |
| 4,633,128 A | 12/1986 | Roberts et al. |
| 4,633,140 A | 12/1986 | Lynch et al. |
| 4,652,790 A | 3/1987 | Wood |
| 4,673,846 A | 6/1987 | Yoshizawa et al. |
| 4,691,179 A | 9/1987 | Blum et al. |
| 4,749,915 A | 6/1988 | Lynch et al. |
| 4,795,658 A | 1/1989 | Kano et al. |
| 4,887,192 A | 12/1989 | Simpson et al. |
| 4,902,935 A | 2/1990 | Wood |
| 4,908,492 A | 3/1990 | Okamoto et al. |
| 4,950,059 A | 8/1990 | Roberts |
| 4,954,755 A | 9/1990 | Lynch et al. |
| 4,975,625 A | 12/1990 | Lynch et al. |
| 4,978,891 A | 12/1990 | Ury |
| 5,021,704 A | 6/1991 | Walker et al. |
| 5,039,903 A | 8/1991 | Farrall |
| 5,051,663 A | 9/1991 | Ury et al. |
| 5,070,277 A | 12/1991 | Lapatovich |
| 5,072,157 A | 12/1991 | Greb et al. |
| 5,077,822 A | 12/1991 | Cremer |
| 5,086,258 A | 2/1992 | Mucklejohn et al. |
| 5,227,698 A | 7/1993 | Simpson et al. |
| 5,313,373 A | 5/1994 | Bjorner et al. |
| 5,334,913 A | 8/1994 | Ury et al. |
| 5,361,274 A | 11/1994 | Simpson et al. |
| 5,404,076 A | 4/1995 | Dolan et al. |
| 5,438,242 A | 8/1995 | Simpson |
| 5,448,135 A | 9/1995 | Simpson |
| 5,498,937 A | 3/1996 | Korber et al. |
| 5,525,865 A | 6/1996 | Simpson |
| 5,541,475 A | 7/1996 | Wood et al. |
| 5,548,182 A | 8/1996 | Bunk et al. |
| 5,594,303 A | 1/1997 | Simpson et al. |
| 5,786,667 A | 7/1998 | Simpson et al. |
| 5,789,863 A | 8/1998 | Takahashi et al. |
| 5,814,951 A | 9/1998 | Smolka et al. |
| 5,831,386 A | 11/1998 | Turner et al. |
| 5,841,242 A | 11/1998 | Simpson et al. |
| 5,866,980 A | 2/1999 | Dolan et al. |
| 5,903,091 A | 5/1999 | MacLennan et al. |
| 5,910,710 A | 6/1999 | Simpson |
| 5,910,754 A | 6/1999 | Simpson et al. |
| 5,923,116 A | 7/1999 | Mercer et al. |
| 5,926,079 A | 7/1999 | Heine et al. |
| 5,949,180 A | 9/1999 | Walker |
| 6,005,332 A | 12/1999 | Mercer |
| 6,016,766 A | 1/2000 | Pirkle et al. |
| 6,020,800 A | 2/2000 | Arakawa et al. |
| 6,031,333 A | 2/2000 | Simpson |
| 6,049,170 A | 4/2000 | Hochi et al. |
| 6,084,348 A | 7/2000 | Love |
| 6,084,356 A | 7/2000 | Seki et al. |
| 6,137,237 A | 10/2000 | MacLennan et al. |
| 6,181,054 B1 | 1/2001 | Levin et al. |
| 6,196,297 B1 | 3/2001 | Campbell et al. |
| 6,246,160 B1 | 6/2001 | MacLennan et al. |
| 6,252,346 B1 | 6/2001 | Turner et al. |
| 6,265,813 B1 | 7/2001 | Knox et al. |
| 6,291,936 B1 | 9/2001 | MacLennan et al. |
| 6,310,443 B1 | 10/2001 | MacLennan et al. |
| 6,313,587 B1 | 11/2001 | MacLennan et al. |
| 6,326,739 B1 | 12/2001 | MacLennan et al. |
| 6,424,099 B1 | 7/2002 | Kirkpatrick et al. |
| 6,476,557 B1 | 11/2002 | Leng et al. |
| 6,509,675 B2 | 1/2003 | MacLennan et al. |
| 6,566,817 B2 | 5/2003 | Lapatovich |
| 6,617,806 B2 | 9/2003 | Kirkpatrick et al. |
| 6,628,079 B2 * | 9/2003 | Golkowski et al. ....... 315/39.51 |
| 6,664,842 B1 | 12/2003 | Pobanz |
| 6,856,092 B2 | 2/2005 | Pothoven et al. |
| 6,922,021 B2 | 7/2005 | Espiau et al. |
| 6,949,887 B2 | 9/2005 | Kirkpatrick et al. |
| 6,962,426 B2 | 11/2005 | Slobodin |
| 6,980,021 B1 | 12/2005 | Srivastava et al. |
| 7,253,091 B2 | 8/2007 | Brewer |
| 7,348,732 B2 | 3/2008 | Espiau et al. |
| 7,358,678 B2 | 4/2008 | Espiau et al. |
| 7,362,054 B2 | 4/2008 | Espiau et al. |
| 7,362,055 B2 | 4/2008 | Espiau et al. |
| 7,362,056 B2 | 4/2008 | Espiau et al. |
| 7,372,209 B2 | 5/2008 | Espiau et al. |
| 7,391,158 B2 | 6/2008 | Espiau et al. |
| 2001/0030509 A1 | 10/2001 | Pothoven et al. |
| 2001/0035720 A1 | 11/2001 | Guthrie et al. |
| 2002/0001056 A1 | 1/2002 | Sandberg et al. |
| 2002/0001135 A1 | 1/2002 | Berman et al. |
| 2002/0030453 A1 | 3/2002 | Kirkpatrick et al. |
| 2002/0105274 A1 | 8/2002 | Pothoven et al. |
| 2005/0057158 A1 | 3/2005 | Chang et al. |
| 2005/0099130 A1 | 5/2005 | Espiau et al. |
| 2005/0212456 A1 | 9/2005 | Espiau et al. |
| 2005/0248281 A1 | 11/2005 | Espiau et al. |
| 2006/0208645 A1 | 9/2006 | Espiau et al. |
| 2006/0208648 A1 | 9/2006 | Espiau et al. |
| 2007/0075652 A1 | 4/2007 | Espiau et al. |

FOREIGN PATENT DOCUMENTS

| | | |
|---|---|---|
| EP | 0 035 898 A1 | 3/1981 |
| EP | 0 419 947 A2 | 9/1990 |
| JP | 8-148127 | 6/1996 |
| JP | 8148127 | 6/1996 |
| WO | WO 97/09748 A1 | 3/1997 |
| WO | WO-9828780 | 7/1998 |
| WO | WO-9936940 A2 | 7/1999 |
| WO | WO 00/16365 A1 | 3/2000 |
| WO | WO-0211181 A1 | 2/2002 |
| WO | WO 03/083900 A1 | 10/2003 |

OTHER PUBLICATIONS

"Espiau Opposition 8 (to Guthrie's Miscellaneous Motion 8 to exclude evidence)", *Guthrie v. Espiau, Patent Interference 105,393*, (Oct. 24, 2007),71 pgs.

"Guthrie Opposition 8 (opposing Espiau miscellaneous motion 8)", *Guthrie v. Espiau, Patent Interference 105,393*, (Oct. 24, 2007),63 pgs.

"Guthrie's objections to Espiau's exhibits served with its motion 8", *Exhibit 2254, Guthrie v. Espiau, Patent Interference 105,393*, (Oct. 18, 2007),6 pgs.

"Katie Marie Nunes Death Certificate", *Exhibit 2258, Guthrie v. Espiau, Patent Interference 105,393*, (Jul. 10, 2000),1 pg.

"Kearney to Pisano Letter", *Re: Guthrie v. Espiau*, (Oct. 19, 2007),12 pgs.

"Modesto Bee Obituaries including Katie Marie Nunes", *Exhibit 2257, Guthrie v. Espiau, Patent Interference 105,393*, (Jul. 10, 2000),3 pgs.

"*Nilssen et al v. Osram Sylvania et al*", *Exhibit 2259, Guthrie v. Espiau, Patent Interference 105,393*, United States Court of Appeals for the Federal Circuit,(Oct. 10, 2007),20 pgs.

"Second Declaration of James E. King, Esq.", *Guthrie Exhibit 2256 Board of Patent Appeals and Interferences* (Interference No. 105,393), (Oct. 19, 2007), 5 pgs.

"Guthrie Fourth Declaration of Charles Guthrie", *Guthrie Exhibit 2255, Board of Patent Appeals and Interferences*(Interference No. 105,393), (Oct. 19, 2007), 4 pg.
U.S. Appl. No. 60/192,731, filed Mar. 27, 2000, E. Sandberg et al.
U.S. Appl. No. 60/224,059, filed Aug. 9, 2000, G. Prior et al.
U.S. Appl. No. 60/224,257, filed Aug. 10, 2000, D. Wilson et al.
U.S. Appl. No. 60/224,289, filed Aug. 10, 2000, D. Wilson et al.
U.S. Appl. No. 60/224,290, filed Aug. 10, 2000, D. Wilson et al.
U.S. Appl. No. 60/224,291, filed Aug. 10, 2000, D. Wilson et al.
U.S. Appl. No. 60/224,298, filed Aug. 10, 2000, G. Prior et al.
U.S. Appl. No. 60/224,866, filed Aug. 11, 2000, D. Wilson et al.
U.S. Appl. No. 60/234,415, filed Sep. 21, 2000, G. Prior et al.
Pisano, N.A.,Amendment and Request for Interference(12pp) and Appendix A(9pp) submitted in U.S. Appl. No. 09/818,092 to Guthrie et al., to USPTO on Nov. 29, 2004.
Prior, G.A. Declaration(6pp) submitted in U.S. Appl. No. 09/818,092 Guthrie et al.
Sandberg, E., Declaration submitted in U.S. Appl. No. 09/818,092 Guthrie et al.
Turner, D., Letter to G.A. Prior(3pp) dated Mar. 31, 2000, submitted in U.S. Appl. No. 09/818,092 Guthrie et al.
Turner, D., Engineering Services Agreement(3pp); Statement of Work (1p) dated Mar. 31, 2000, submitted in U.S. Appl. No. 09/818,092 Guthrie et al.
Turner, D., electronic mail message to Wayne Catlett(2pp) sent on Jun. 26, 2000, submitted in U.S. Appl. No. 09/818,092 Guthrie et al.
The six documents cited above were available via USPTO Public PAIR on or after Nov. 29, 2004.
Counter Statement Under Rule 7(3) In the Matter of: European Patent Application No. 01957305.4 (EP 1307899), In the Name of: Luxim Corporation dated Jan. 21, 2006 An In the Matter of: And Application Under Section 12 and 82 of the Patents Act 1977 and Articles 1 and 3 of the Protocol on Recognition by Cervasion Limited ("Counterstatement").
Order to Show Cause Bd. R. 202(d), of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006 (Schedule 1 of Counterstatement).
Guthrie, C., Drawings Submitted with Suggestion of Interference filed Nov. 29, 2004 in U.S. Appl. No. 09/818,092, and Cited in and Available from Order to Show Cause (OSC) in Patent Interference No. 105,393 mailed from Administrative Patent Judge S. Medley on Jan. 24, 2006. (See p. 10 Lines 1-7 and FN4 of OSC).
Decision of Hon. Thomas WM. Cain, Judge of the Superior Court of California, in *Robert P. Schiro v. Digital Reflection, Inc.*, dated May 11, 2004, (Schedule 2 of Counterstatement).
Mr. Turner's 31st March, 2000 Memorandum and Agreement Referred to in Paragraph 19 of the Statement of Case, DRI-00-01 and a BNDA (Schedule 3 of Counterstatement).
Fusion's International Patent Application WO 99/36940 published Jul. 22, 1999 (Schedule 4 of Counterstatement).
DRI's Schematic dated Apr. 12, 2000 (Schedule 5 of Counterstatement).
Mr. Turner's Notes from the Apr. 11, 2000 Meeting (Schedule 6 of Counterstatement).
Mr. Turner's Apr. 14, 2000 Memorandum and it Attachments including the Second Statement of Work(DRI-00-02), (Schedule 7 of Counterstatement).
DRI's Apr. 20, 2000 Presentation Materials "Dielectric Resonator Concept for Plasma Lamps" (Schedule 8 of Counterstatement).
Excerpt from Professor Joshi's Notebook dated Apr. 20, 2000, (Schedule 9 of Counterstatement).
Mr. Turner's May 12, 2000 Plasma Lamp Development Plan Memorandum, Email and other Attachments thereto, (Schedule 10 of Counterstatement).
Mr. Turner's Oct. 27, 2000 Email, (Schedule 11 of Counterstatement).
Mr. Turner's Nov. 3, 2000 Letter, (Schedule 12 of Counterstatement).
Mr. Turner's May 22, 2001 Letter, (Schedule 13 of Counterstatement).

Declaration of Patent Interference No. 105,393 between U.S. Appl. No. 09/818,092 (Guthrie, junior party) and U.S. Patent 6,737,809 (Espiau, senior party) by Administrative Patent Judge S. Medley mailed on Jan. 24, 2006.
Espiau, Frederick M., et al., U.S. Appl. No. 11/084,069 "Plasma Lamp with Dielectric Waveguide", filed Mar. 18, 2005.
Espiau, Frederick M., et al., U.S. Appl. No. 11/083,552 "Plasma Lamp with Dielectric Waveguide", filed Mar. 18, 2005.
Espiau, Frederick M., et al., U.S. Appl. No. 11/083,557 "Plasma Lamp with Dielectric Waveguide", filed Mar. 18, 2005.
Espiau, Frederick M., et al., U.S. Appl. No. 11/083,558 "Plasma Lamp with Dielectric Waveguide", filed Mar. 18, 2005.
Espiau, Frederick M., et al., U.S. Appl. No. 11/083,559 "Plasma Lamp with Dielectric Waveguide", filed Mar. 18, 2005.
Kirkpatrick, Douglas A., U.S. Appl. No. 60/133,885 "High Brightness Microwave Lamp", filed May 12, 1999.
Kirkpatrick, Douglas A., U.S. Appl. No. 60/177,271 "High Brightness Microwave Lamp", filed Jan. 21, 2000.
"'Coating Definition', from www.answers.com", *Espiau Exhibit 1019, in Board of Patent Appeals and Interferences* (Interference No. 105,393), (Mar. 31, 2006),5 pgs.
"'Coating' Definition from online dictionary, www.thefreedictionary.com/coating", *Espiau Exhibit 1020, in Board of Patent Appeals and Interferences* (Interference No. 105,393), (Mar. 21, 2006),4 pgs.
"'Coating' Definition from www.WordReference.com", *Espiau Exhibit 1021, in Board of Patent Appeals and Interferences* (Interference No. 105,393), (Mar. 21, 2006),2 pgs.
"Chapter 4—Cavity Resonators, Department of the Army Technical Manual, TM 11-673—Generation and Transmission of Microwave Energy", *Guthrie Exhibit 2104, Board of Patent Appeals and Interferences* (Interference No. 105,393), (Jun. 1953),12 pgs.
"Definition of 'Waveguide'", *Webster's II New College Dictionary (3rd Edition), Guthrie Exhibit 2047, Board of Patent Appeals and Interferences* (Interference No. 105,393), 2 pgs.
"Diligence Calendar", *Guthrie Exhibit 2044, Board of Patent Appeals and Interferences* (Interference No. 105,393), (Jul. and Aug. 2000),1 pg.
"File History of US 6,566,817, for High Intensity Discharge Lamp With Only One Electrode, filed Sep. 24, 2001 by Lapatovich, et al.", *Espiau Exhibit 1097, Board of Patent Appeals and Interferences* (Interference No. 105,393), 94 pgs.
"File History of US 6,922,021 for a Microwave Energized Plasma Lamp With Solid Dielectric Waveguide, filed by Jul. 26, 2005 by Espiau, et al.", *Guthrie Exhibit 2078, Board of Patent Appeals and Interferences* (Interference No. 105,393), 468 pgs.
"File History of US 6,962,426 for Recirculation of Reflected Source Light in an Image Projection System, filed Nov. 29, 2001 by Slobodin", *Espiau Exhibit 1096, Board of Patent Appeals and Interferences* (Interference No. 105,393), 116 pgs.
"Fusion Lighting's Website / Lamps for Special Applications", http://www.web.archive.org/web/20010602134016/fusionlighting.com/special.htm; *Guthrie Exhibit 2125, Board of Patent Appeals and Interferences* (Interference No. 105,393), (archived Jun. 2, 2001),2 pgs.
"Google "Coating" Definition Search Results", *Espiau Exhibit 1018, in Board of Patent Appeals and Interferences* (Interference No. 105,393), (Mar. 31, 2006),2 pgs.
"Handout for Experiment 1: "Cavity Resonator", Electrical Engineering Department School of Engineering and Applied Science, University of California, Los Angeles", *Espiau Exhibit 1026, in Board of Patent Appeals and Interferences* (Interference No. 105,393), (Winter, 1995),5 pgs.
"Handout for Experiment 3: Cavity Resonator, Electrical Engineering Department, School of Engineering and Applied Science, University of California, Los Angeles", *Espiau Exhibit 1025, in Board of Patent Appeals and Interferences* (Interference No. 1025), (Winter, 1991),15 pgs.
"Luxim Corporation Consulting Agreement", *Espiau Exhibit 1090, Board of Patent Appeals and Interferences* (Interference No. 105,393), (Jun. 12, 2006),6 pgs.

"Luxim Corporation's Website", *Guthrie Exhibit 2114, Board of Patent Appeals and Interferences* (Interference No. 105,393), (Apr. 11, 2006),50 pgs.

"Luxim Corporation, "Microwave Energized Plasma Lamps"; MiPL: Product Development Plan", *Guthrie Exhibit 2009, Board of Appeals and Interferences* (Interference No. 105,393), (Aug. 2002),14 pgs.

"Other Disclosure Materials—File: "An External Heat Sink"", *Guthrie Exhibit 2025, Board of Patent Appeals and Interferences* (Interference No. 105,393), (Jul. 28, 2000),3 pgs.

"Other Disclosure Materials—File: Light Source 2.1", *Guthrie Exhibit 2021, Board of Patent Appeals and Interferences* (Interference No. 105,393), (Aug. 8, 2000),4 pgs.

"Other Disclosure Materials—File: Light Source 2.11", *Guthrie Exhibit 2026, Board of Patent Appeals and Interferences* (Interference No. 105,393), (Jul. 28, 2000),2 pgs.

"Other Disclosure Materials—File: Light Source 2.2A", *Guthrie Exhibit 2022, Board of Patent Appeals and Interferences* (Interference No. 105,393), (Jul. 27, 2000),4 pgs.

"Other Disclosure Materials—File: Light Source 2.6", *Guthrie Exhibit 2023, Board of Patent Appeals and Interferences* (Interference No. 105,393), (Aug. 8, 2000),2 pgs.

"Other Disclosure Materials—File: Light Source 2.9", *Guthrie Exhibit 2024, Board of Patent Appeals and Interferences* (Interference No. 2024), (Jul. 27, 2000),3 pgs.

"Photograph of Gas-Filled Quartz Bulbs", *Guthrie Exhibit 2042, Board of Patent Appeals and Interferences* (Interference No. 105,393), 1 pg.

"Photographs of Full Wavelength Waveguide", *Guthrie Exhibit 2040, Board of Patent Appeals and Interferences* (Interference No. 105,393), 1 pgs.

"Photographs of Half Wavelength Ceramic Waveguide", *Guthrie Exhibit 2041, Board of Patent Appeals and Interferences* (Interference No. 105,393), 1 pg.

"Picture of Lamp Fixture", *Guthrie Exhibit 2036, Board of Patent Appeals and Interferences* (Interference No. 105,393), 1 pg.

"Presentation Materials—Wave Guide Material", *Guthrie Exhibit 2067, Board of Patent Appeals and Interferences* (Interference No. 105,393), 7 pgs.

"Priority-Claimed Disclosure Materials—File: Light Source 2.13", *Guthrie Exhibit 2020, Board of Patent Appeals and Interferences* (Interference No. 105,393), (Aug. 3, 2000),2 pgs.

"Priority-Claimed Disclosure Materials—File: Light Source 2.2", *Guthrie Exhibit 2014, Board of Patent Appeals and Interferences* (Interference No. 105,393), (Jul. 27, 2000),3 pgs.

"Priority-Claimed Disclosure Materials—File: Light Source 2.3", *Guthrie Exhibit 2015, Board of Patent Appeals and Interferences* (Interference No. 105,393), (Jul. 19, 2000),4 pgs.

"Priority-Claimed Disclosure Materials—File: Light Source 2.7", *Guthrie Exhibit 2018, Board of Patent Appeals and Interferences* (Interference No. 105,393), (Jul. 27, 2000)4 pgs.

"Priority-Claimed Disclosure Materials—File: Light Source 2.4", *Guthrie Exhibit 2016, Board of Patent Appeals and Interferences* (Interference No. 105,393), (Aug. 8, 2000),4 pgs.

"Priority-Claimed Disclosure Materials—File: Light Source 2.5", *Guthrie Exhibit 2017, Board of Patent Appeals and Interferences* (Interference No. 105,392), (Jul. 28, 2000),4 pgs.

"Priority-Claimed Disclosure Materials—File: Light Source 2.8", *Guthrie Exhibit 2019, Board of Patent Appeals and Interferences* (Interference No. 105,393), (Jul. 26, 2000),5 pgs.

"Synonyms for the Word 'Direct', from Thesaurus.com", *Guthrie Exhibit 2110, Board of Patent Appeals and Interferences* (Interference No. 105,393), (Jun. 18, 2006),1 pg.

"Turner Engineering Company; Conceptual Design: Final PowerPoint Presentation", *Guthrie Exhibit 2070, Board of Patent Appeals and Interferences* (Interference No. 105,393), (May 22, 2000),30 pgs.

"Turner Engineering Corporation's Website", *Guthrie Exhibit 2113, Board of Patent Appeals and Interferences* (Interference No. 105,393), (Jun. 13, 2006),25 pgs.

Bergan, D. A., "E-Mail to N. Pisano With Espiau's Objections to Guthrie's Reply Exhibits (Exhibits 2123, 2124, 2125 and 2126)", *Espiau Exhibit 1103, Board of Patent Appeals and Interferences* (Interference No. 105,393), (Sep. 8, 2006),5 pgs.

Berman, A. , "Declaration", *Guthrie Exhibit 2071, Board of Patent Appeals and Interferences* (Interference No. 105,393), (Feb. 20, 2006),6 pgs.

Bleaney, B. J., et al., "Electricity and Magnetism, Second Edition, 1965, Oxford at the Clarendon Press", *Guthrie Exhibit 2108, Board of Patent Appeals and Interferences* (Interference No. 105,393), (1965),8 pgs.

Catlett, F. W., "Deposition Transcript", *Guthrie Exhibit 2007, Board of Patent Appeals and Interferences* (Interference No. 105,393), (Jun. 1, 2005),181 pgs.

Chang, Y. , et al., "Plasma Lamp, U.S. Appl. No. 60/222,028, filed Jul. 31, 2000", *Espiau Exhibit 1012, in Board of Patent Appeals and Interferences* (Interference No. 105,393), (Jul. 31, 2000),28 pgs.

Espiau, F. M., et al., "File History, Plasma Lamp With Dielectric Waveguide (U.S. Appl. No. 09/809,718, filed Mar. 15, 2001)", *Espiau Exhibit 1013, in Board of Patent Appeals and Interferences* (Interference No. 105,393), (Mar. 15, 2001),46 pgs.

Everett, S. , "Declaration", *Guthrie Exhibit 2075, Board of Patent Appeals and Interferences* (Interference No. 105,393), (Mar. 13, 2006),3 pgs.

Ghandi, O. P., "Microwave Engineering and Applications, Pergamon Press, Inc.", *Guthrie Exhibit 2119, Board of Patent Appeals and Interferences* (Interference No. 105,393), (1981),6 pgs.

Gray, E. , "Reply to Office Action of Nov. 3, 2002, in Plasma Lamp With Dielectric Waveguide, U.S. Appl. No. 09/809,718, filed Mar. 11, 2001", *Guthrie Exhibit 2088, Board of Patent Appeals and Interferences* (Interference No. 105,393), (Mar. 6, 2003),76 pgs.

Gray, E. , "Reply to Office Communication for Plasma Lamp With Dielectric Waveguide, U.S. Appl. No. 09/809,718 (Espiau)", *Guthrie Exhibit 2097, Patent Appeals and Interferences* (Interference No. 105,393), (Sep. 27, 2003),66 pgs.

Gupta, M. S., "Corrected Third Declaration", *Guthrie Exhibit 2121, Board of Patent Appeals and Interferences* (Interference No. 105,393), (Aug. 1, 2006),34 pgs.

Gupta, M. S., "Curriculum Vitae", *Guthrie Exhibit 2090, Board of Patent Appeals and Interferences* (Interference No. 105,393), 36 pgs.

Gupta, M. S., "Declaration", *Guthrie Exhibit 2089, Board of Patent Appeals and Interferences* (Interference No. 105,393), (May 1, 2006),28 pgs.

Gupta, M. S., "Deposition Transcript", *Guthrie Exhibit 2122, Board of Patent Appeals and Interferences*, (Interference No. 105,393),(Aug. 16, 2006),71 pgs.

Gupta, M , "Deposition Transcript", *Guthrie Exhibit 2117, Board of Patent Appeals and Interferences* (Interference No. 105,393), (Jun. 22, 2006),48 pgs.

Gupta, M. S., "Espiau Errata to the Transcript of the Aug. 16, 2006 Deposition of Madhu S. Gupta, Ph.D.", *Espiau Exhibit 1089, Board of Patent Appeals and Interferences* (Interference No. 105,393), (Aug. 16, 2006),2 pgs.

Gupta, M. S., "Fourth Declaration of Madhu S. Gupta, Ph.D.", *Guthrie Exhibit 2124, Board of Patent Appeals and Interferences* (Interference No. 105,393), (Sep. 5, 2006),17 pgs.

Gupta, M. S., "Second Declaration", *Guthrie Exhibit 2105, Board of Patent Appeals and Interferences* (Interference No. 105,393), (May 22, 2006),24 pgs.

Gupta, M. S., "Transcription of Deposition of Madhu S. Gupta, Ph.D. (vol. III)", *Guthrie Exhibit 2132, Board of Patent Appeals and Interferences* (Interference No. 105,393), (Oct. 3, 2006),106 pgs.

Guthrie, C. , "'Correction Documentation' to Light Source Files 2.1-2.13", *Guthrie Exhibit 2032, Board of Patent Appeals and Interferences* (Interference No. 105,393), (Aug. 3, 2000),2 pgs.

Guthrie, C. , et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000 (*Guthrie Exhibit 2028, Board of Patent Appeals and Interferences* (Interference No. 105,393)), 9 pgs.

Guthrie, C. , et al., "A Method for Connecting the Antenna on a Printed Wiring Board to a Wave-Guide in a Light Source in Which an Electrode-Less Lamp is Built Into the Wave-Guide Structure", U.S. Appl. No. 60/224,061, filed Aug. 9, 2000 (*Guthrie Exhibit 2027, Board of Patent Appeals and Interferences* (Interference No. 105,393), 9 pgs.

Guthrie, C., "Ceramic Test Sample; SPL002 Engineering Drawing", *Guthrie Exhibit 2061, Board of Patent Appeals and Interferences* (Interference No. 105,393), (Apr. 27, 2000), 1 pg.

Guthrie, C., "Concept 3 With Heat Sink; WGC003 Engineering Drawing", *Guthrie Exhibit 2064, Board of Patent Appeals and Interferences* (Interference No. 105,393), (May 16, 2000),1 pg.

Guthrie, C., et al., "Declaration", *Guthrie Exhibit 2006, Board of Patent Appeals and Interferences* (Interference No. 105,393), (Feb. 20, 2006),14 pgs.

Guthrie, C., "Half Wavelength Waveguide Drawing (CTS010)", *Guthrie Exhibit 2048, Board of Patent Appeals and Interferences* (Interference No. 105,393), (Jul. 20, 2000),1 pg.

Guthrie, C., "Lamp With Integrated Waveguide Version I; LWG001 Engineering Drawing", *Guthrie Exhibit 2060, Board of Patent Appeals and Interferences* (Interference No. 105,393), (Apr. 27, 2000),1 pg.

Guthrie, C., "SPL020: Engineering Drawing", *Guthrie Exhibit 2043, Board of Patent Appeals and Interferences* (Interference No. 105,393), (Nov. 3, 2000),2 pgs.

Guthrie, C., "Waveguide Lamp Concept 3; WGC003 Engineering Drawing", *Guthrie Exhibit 2062, Board of Patent Appeals and Interferences* (Interference No. 105,393), (May 10, 2000),1 pg.

Guthrie, C., "Waveguide Lamp Concept 3; WGC003 Engineering Drawing—Waveguide Package", *Guthrie Exhibit 2063, Board of Patent Appeals and Interferences* (Interference No. 105,393), (May 10, 2000),1 pg.

Hoover, E., "Declaration", *Guthrie Exhibit 2011, Board of Patent Appeals and Interferences* (Interference No. 105,393), (Feb. 17, 2006),5 pgs.

Johnson, A., "E-Mail Message to D. Bergan with Espiau's Objections to Guthrie's Opposition Motion Exhibits (Exhibits 2119 and 2120)", *Espiau Exhibit 1102, Board of Patent Appeals and Interferences* (Interference No. 105,393), (Oct. 16, 2006),7 pgs.

Joshi, C. J., "Declaration", *Espiau Exhibit 1051, Board of Patent Appeals and Interferences* (Interference No. 105,393), (May 22, 2006),3 pgs.

Joshi, C. J., "Deposition Transcript", *Espiau Exhibit 1068, Board of Patent Appeals and Interferences* (Interference No. 105,393) (Jul. 7, 2006),50 pgs.

Joshi, C. J., "Handwritten "Integrated Lamp-Waveguide Concept", with attached note", *Espiau Exhibit 1031, Board of Patent Appeals and Interferences* (Interference No. 105,393), (Jul. 11, 2000),13 pgs.

Joshi, C. J., "Notebook Entries", *Espiau Exhibit 1029, Board of Patent Appeals and Interferences* (Interference No. 105,393), (Apr. 12, 2000 through Apr. 20, 2000),16 pgs.

Joshi, C. J., "Provisional Draft "Integrated Lamp Waveguide Concept", attached to E-Mail from Simon, N.", *Espiau Exhibit 1032, Board of Patent Appeals and Interferences* (Interference No. 105,393), (Jul. 11, 2000),13 pgs.

Kipling, K., et al., "High Brightness Electrodeless Lamp for Projection Display, Society for Information Display", *Espiau Exhibit 1079, Board of Patent Appeals and Interferences* (Interference No. 105,393), (May 1999),4 pgs.

Kirkpatrick, D. A., "Aperture Lamps", *Proceedings, 9th International Symposium on Science & Technology of Light Sources, Espiau Exhibit 1082, Board of Patent Appeals and Interferences* (Interference No. 105,393), (Aug. 2001),10 pgs.

Lee, B. T., "Final Office Action, for U.S. Appl. No. 09/818,092, filed Mar. 26, 2001", *Espiau Exhibit 1048, Board of Patent Appeals and Interferences* (Interference No. 105,393), (Feb. 2, 2004),6 pgs.

Lee, B. T., "Office Action for U.S. Appl. No. 09/818,092, filed Mar. 26, 2001", *Guthrie Exhibit 2002, Board of Patent Appeals and Interferences* (Interference No. 105,393), (Jul. 27, 2004),6 pgs.

Lohse, T., "Declaration", *Guthrie Exhibit 2013, Board of Patent Appeals and Interferences* (Interference No. 105,393), (Feb. 20, 2006),3 pgs.

Mancuso, M. J., "Petition to Accept Unintentionally Delayed Claim for Priority Under 35 U.S.C. 119(e) for the Benefit of Prior Filed Provisional Applications", *Guthrie Exhibit 2092, Board of Patent Appeals and Interferences* (Interference No. 105,393), (Apr. 27, 2006),6 pgs.

Mitcheson, T., et al., "Statement of Case, Ceravision Filing in UK Entitlement", *Guthrie Exhibit 2037, Board of Patent Appeals and Interferences* (Interference No. 105,393), 52 pgs.

Morgan, R. C., "Espiau Opposition 1", *Board of Patent Appeals and Interferences* (Interference No. 105,393), (Jul. 18, 2006),51 pgs.

Morgan, R. C., "Espiau Opposition 2", *Board of Appeals and Patent Interferences* (Interference No. 105,393), (Jul. 18, 2006),50 pgs.

Morgan, R. C., "Espiau Opposition 3", *Board of Patent Appeals and Interferences* (Interference No. 105,393), (Jul. 18, 2006),45 pgs.

Morgan, R. C., "Espiau Opposition 4", *Board of Patent Appeals and Interferences* (Interference No. 105,393), (Jul. 18, 2006),97 pgs.

Morgan, R. C., "Espiau Reply 2 Re: Espiau's Motion 2", *Board of Patent Appeals and Interferences* (Interference No. 105,393), (Sep. 5, 2006),101 pgs.

Morgan, R. C., "Espiau Reply 4", *Board of Patent Appeals and Interferences* (Interference No. 105,393), (Sep. 5, 2005),95 pgs.

Morgan, R., "Espiau Reply on Motion 3", *Board of Patent Appeals and Interferences* (Interference No. 105,393), (Sep. 5, 2006),83 pgs.

Morgan, M., "Order Approving Trustee's Sale of Debtor's Assets to Wilson/Guthrie (United States Bankruptcy Court—Northern District of California", *Espiau Exhibit 1086, Board of Patent Appeals and Interferences* (Interference No. 105,393), (Mar. 10, 2004),29 pgs.

Neate, A., "Declaration", *Guthrie Exhibit 2057, Board of Patent Appeals and Interferences* (Interference No. 105,393), (Feb. 21, 2006),4 pgs.

Neate, A., "DRI Dielectric Waveguide Analysis Results Engineering Report", *Guthrie Exhibit 2058, Board of Patent Appeals and Interferences* (Interference No. 105,393), 5 pgs.

Neifeld, R., "E-Mail Message to T. Kearney, et al. With Espiau's Objections to Guthrie's Preliminary Motion Exhibits", *Espiau Exhibit 1100, Board of Patent Appeals and Interferences* (Interference No. 105,393), (May 9, 2006), 7 pgs.

Neifeld, R., "E-Mail to T. Kearney, et al. With Espiau's Objections to Guthrie's Responsive Motion Exhibits", *Espiau Exhibit 1101, Board of Patent Appeals and Interferences* (Interference No. 105,393), (May 30, 2006),5 pgs.

Neifeld, R., "Espiau Motion 2, Espiau's Claims are not patentable to Guthrie", *Board of Patent Appeals and Interferences* (Interference No. 105,393), (May 2, 2006),49 pgs.

Neifeld, R., "Espiau Motion 3 to Deny Guthrie Benefit of Provisionals", *Board of Patent Appeals and Interferences* (Interference No. 105,393), (May 2, 2006),42 pgs.

Neifeld, R., "Espiau Motion 4 to Add Count 2", *Board of Patent Appeals and Interferences* (Interference No. 105,393), (May 2, 2006),83 pgs.

Patel, M., "Declaration", *Guthrie Exhibit 2073, Board of Patent Appeals and Interferences* (Interference No. 105,393), (Mar. 14, 2006),5 pgs.

Pisano, N. A., "Amendment and Request Under 35 U.S.C. Sec. 1.604 For Interference With Application", *Guthrie Exhibit 2001, Board of Patent Appeals and Interferences* (Interference No. 105,393), (Apr. 30, 2004),25 pgs.

Pisano, N. A., "Declaration", *Guthrie Exhibit 2072, Board of Patent Appeals and Interferences* (Interference No. 105,393), (Feb. 21, 2006),14 pgs.

Pisano, N. A., "Guthrie Contingent Responsive Motion 4", *Board of Patent Appeals and Interferences* (Interference No. 105,393), (May 23, 2006),57 pgs.

Pisano, N. A., "Guthrie Miscellaneous Motion 2", *Board of Patent Appeals and Interferences* (Interference No. 105,393), (May 2, 2006),64 pgs.

Pisano, N. A., "Guthrie Opposition to Espiau Motion 2", *Board of Patent Appeals and Interferences* (Interference No. 105,393), (Jul. 18, 2006),84 pgs.

Pisano, N. A., "Guthrie Opposition to Espiau Motion 3", *Board of Patent Appeals and Interferences* (Interference No. 105,393), (Jul. 18, 2006),70 pgs.

Pisano, N. A., "Guthrie Opposition to Espiau Motion 4", *Board of Patent Appeals and Interferences* (Interference No. 105,393), (Jul. 18, 2006),92 pgs.

Pisano, N. A., "Guthrie Preliminary Motion 1", *Board of Patent Appeals and Interferences* (Interference No. 105,393), (May 2, 2006),27 pgs.

Pisano, N. A., "Guthrie Preliminary Motion 3", *Board of Patent Appeals and Interferences* (Interference No. 105,393), (May 2, 2006),18 pgs.

Pisano, N. A., "Guthrie Reply 1", *Board of Patent Appeals and Interferences* (Interference No. 105,393), (Sep. 5, 2006),52 pgs.

Pisano, N. A., "Guthrie Reply 2", *Board of Patent Appeals and Interferences* (Interference No. 105,393), (Sep. 5, 2006),47 pgs.

Pisano, N. A., "Guthrie Reply 3", *Board of Patent Appeals and Interferences* (Interference No. 105,393), (Sep. 5, 2006),45 pgs.

Pisano, N. A., "Guthrie Reply 4", *Board of Patent Appeals and Interferences* (Interference No. 105,393), (Sep. 5, 2006),93 pgs.

Pisano, N. A., "Guthrie's Objections to Espiau's Opposition Exhibits", *Guthrie Exhibit 2129, Board of Patent Appeals and Interferences* (Interference No. 105,393), (Jul. 25, 2006),12 pgs.

Pisano, N. A., "Guthrie's Objections to Espiau's Preliminary Motion Exhibits", *Guthrie Exhibit 2127, Board of Patent Appeals and Interferences* (Interference No. 105,393), (May 9, 2006),10 pgs.

Pisano, N. A., "Guthrie's Objections to Espiau's Reply Exhibits", *Guthrie Exhibit 2130, Board of Patent Appeals and Interferences* (Interference No. 105,393), (Sep. 12, 2006),11 pgs.

Pisano, N. A., "Guthrie's Objections to Espiau's Supplemental Preliminary Motion Exhibits", *Guthrie Exhibit 2128, Board of Patent Appeals and Interferences* (Interference No. 105,393), (May 31, 2006),7 pgs.

Pisano, N. A., "Guthrie's Objections to Exhibits Introduced in Espiau's Motion to Exclude", *Guthrie Exhibit 2134, Board of Patent Appeals and Interferences* (Interference No. 105,393), (Oct. 23, 2006),4 pgs.

Pisano, N. A., "Second Declaration", *Guthrie Exhibit 2076, Board of Patent Appeals and Interferences* (Interference No. 105,393), (Mar. 14, 2006),3 pgs.

Pisano, N. A., et al., "Transcript of Mar. 21, 2006 Telephone Conference", *Espiau Exhibit 1069, Board of Patent Appeals and Interferences* (Interference No. 105,393), (Mar. 21, 2006),117 pgs.

Pisano, N. A., et al., "Transcript of Telephonic Hearing before Administrative Patent Judge Sally C. Medley", *Guthrie Exhibit 2123, Board of Patent Appeals and Interferences* (Interference No. 105,393), (Aug. 24, 2006),33 pgs.

Pobanz, C. J., "Declaration", *Espiau Exhibit 1030, Board of Patent Appeals and Interferences* (Interference No. 105,393), (Apr. 27, 2006),7 pgs.

Pobanz, C. W., "MasterCard Statement", *Espiau Exhibit 1052, Board of Patent Appeals and Interferences* (Interference No. 105,393), (Apr. 7, 2000),3 pgs.

Pobanz, C. W., "MasterCard Statement", *Espiau Exhibit 1053, Board of Patent Appeals and Interferences* (Interference No. 105,393), (May 8, 2000),2 pgs.

Pobanz, C. W., "Second Declaration", *Espiau Exhibit 1054, Board of Patent Appeals and Interferences* (Interference No. 105,393), (May 20, 2006),3 pgs.

Pozar, D. M., "Curriculum Vitae", *Exhibit 1035, Board of Patent Appeals and Interferences* (Interference No. 105,393), 3 pgs.

Pozar, D. M., "Declaration", *Espiau Exhibit 1056, Board of Patent Appeals and Interferences* (Interference No. 105,393), (Apr. 29, 2006),14 pgs.

Pozar, D. M., "Deposition Transcript", *Espiau Exhibit 1063, Board of Patent Appeals and Interferences* (Interference No. 105,393), (Jun. 19, 2006),67 pgs.

Pozar, D. M., "Errata to the Transcript of the Jun. 19, 2006 Deposition of David M. Pozar", *Espiau Exhibit 1064, Board of Patent Appeals and Interferences* (Interference No. 105,393), (Jul. 6, 2006),3 pgs.

Pozar, D. M., "Fourth Declaration of David M. Pozar", *Espiau Exhibit 1085, Board of Patent Appeals and Interferences* (Interference No. 105,393), (Aug. 31, 2006),14 pgs.

Pozar, D. M., "Second Declaration", *Espiau Exhibit 1057, Board of Patent Appeals and Interferences* (Interference No. 105,393), (May 21, 2006),4 pgs.

Pozar, D. M., "Section 4.7 Excitation of Waveguides—Electric and Magnetic Currents", In: Microwave Engineering, 3rd Edition, 2005 (John Wiley & Sons, Inc.), *Espiau Exhibit 1077, Board of Patent Appeals and Interferences* (Interference No. 105,393), (2005),8 pgs.

Pozar, D. M., "Section 5.8 Tapered Lines", In: Microwave Engineering, 3rd Edition, 2005 (John Wiley & Sons, Inc.), *Espiau Exhibit 1036, Board of Patent Appeals and Interferences* (Interference No. 105,393), (2005),9 pgs.

Pozar, D. M., "Section 6.4 Circular Waveguide Cavities", in: Microwave Engineering, 3rd Edition, 2005 (John Wiley & Sons, Inc.), *Espiau Exhibit 1076, Board of Patent Appeals and Interferences* (Interference No. 105,393), (2005),8 pgs.

Poszar, D. M., "Third Declaration", *Espiau Exhibit 1078, Board of Patent Appeals and Interferences* (Interference No. 105,393), (Jul. 13, 2006),9 pgs.

Prior, G.A., *Patent Disclosure Summary (undated)*, 2 pgs.

Prior, G.A., *Patent Disclosure Summary*, (Aug. 10, 2000),3 pages.

Prior, G., et al., "Quartz Bulb Enclosed in a Wave-Guide", U.S. Appl. No. 60/234,415, filed Sep. 21, 2000 (*Espiau Exhibit 1006, Board of Patent Appeals and Interferences* (Interference No. 105,393)).

Prior, G., et al., "Wave-Guide Used for the Excitation of an Electrode-Less Metal Halide Plasma Lamp Incorporating a Sold Dielectric Material", U.S. Appl. No. 60/224,059, filed Aug. 9, 2000 (*Guthrie Exhibit 2049, Board of Patent Appeals and Interferences* (Interference No. 105,393)).

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000 (*Guthrie Exhibit 2054, Board of Patent Appeals and Interferences* (Interference No. 105,393)).

Sandberg, E., et al., "A Mechanical Means of Sealing the Window to an Electrode-Less Metal Halide Bulb That is Integrated Into a Waveguide", U.S. Appl. No. 60/262,536, filed Jan. 17, 2001 (*Guthrie Exhibit 2094, Board of Patent Appeals and Interferences* (Interference No. 105,393)), 6 pgs.

Sandberg, E., "An Improved Drive Circuit for an Electrode-Less Plasma Lamp That is Embedded in a Waveguide", U.S. Appl. No. 60/241,198, filed Oct. 17, 2000 (*Guthrie Exhibit 2093, Board of Patent Appeals and Interferences* (Interference No. 105,393)), 7 pgs.

Sandberg, E., "Declaration", *Guthrie Exhibit 2035, Board of Patent Appeals and Interferences* (Interference No. 105,393), (Dec. 12, 2005),3 pgs.

Sandberg, E., "Declaration of Edmund Sandberg", *Guthrie Exhibit 2010, Board of Patent Appeals and Interferences* (Interference No. 105,393), (Feb. 20, 2006),14 pgs.

Sandberg, E., et al., "High Efficiency Prism Assembly for Image Projection", U.S. Appl. No. 60/192,258, filed Mar. 27, 2000 (*Espiau Exhibit 1094, Board of Patent Appeals and Interferences* (Interference No. 1094)), 21 pgs.

Sandberg, E., "Light Source for Use in Microdisplay Based Light Engines", U.S. Appl. No. 60/192,731, filed Mar. 27, 2000 (*Guthrie Exhibit 2045, Board of Patent Appeals and Interferences* (Interference No. 105,393)).

Shatz, N., et al., "Optimal Design of Nonimaging Projector Lens for Use With an RF-Powered Source and a Rectangular Target", *Proceedings of SPIE*, vol. 4446, *Espiau Exhibit 1080, Board of Patent Appeals and Interferences* (Interference No. 105,393), (2002),14 pgs.

Simon, N., "Declaration", *Espiau Exhibit 1055, Board of Patent Appeals and Interferences* (Interference No. 105,393), (May 18, 2006),4 pgs.

Smoler, D. E., "Declaration", *Guthrie Exhibit 2074, Board of Patent Appeals and Interferences* (Interference No. 105,393), (Mar. 13, 2006),6 pgs.

Stallman, M., "Declaration", Guthrie Exhibit 2012, Board of Patent Appeals and Interferences (Interference No. 105,393), (Feb. 21, 2006),4 pgs.

Thomas, T., "Guthrie Declaration of Tony Thomas", *Guthrie Exhibit 2008, Board of Patent Appeals and Interferences* (Interference No. 105,393), (Feb. 19, 2006),4 pgs.

Turner, B. P., "Curriculum Vitae of Brian P. Turner, Ph.D.", *Espiau Exhibit 1065, Board of Patent Appeals and Interferences* (Interference No. 105,393), 4 pgs.

Turner, B. P., "Declaration", *Espiau Exhibit 1066, Board of Patent Appeals and Interferences* (Interference No. 105,393), (Jul. 12, 2006),4 pgs.

Turner, D., "Declaration", *Espiau Exhibit 1034, Board of Patent Appeals and Interferences* (Interference No. 105,393), (Apr. 27, 2006),5 pgs.

Turner, B. P., "Deposition Transcript of Brian P. Turner, Ph.D.", *Espiau Exhibit 1099, Board of Patent Appeals and Interferences* (Interference No. 105,393), (Oct. 6, 2006),85 pgs.

Turner, D. B., "Deposition Transcript of David B. Turner", *Espiau Exhibit 1067, Board of Patent Appeals and Interferences* (Interference No. 105,393), (Jul. 6, 2006),56 pgs.

Turner, D., "E-Mail Message to Chan Joshi, et al.", *Guthrie Exhibit 2065, Board of Patent Appeals and Interferences* (Interference No. 105,393), (May 15, 2000),1 pg.

Turner, D., "E-Mail Message to Chan Joshi, et al., with attached PowerPoint Presentation", *Guthrie Exhibit 2069, Board of Patent Appeals and Interferences* (Interference No. 105,393), (May 18, 2000),32 pgs.

Turner, D., "E-Mail Message to Charles Guthrie", *Guthrie Exhibit 2068, Board of Patent Appeals and Interferences* (Interference No. 105,393), (May 17, 2000),1 pg.

Turner, D., "E-Mail Message to Charlie Guthrie", *Guthrie Exhibit 2066, Board of Patent Appeals and Interferences* (Interference No. 105,393), (May 15, 2000),1 pg.

Turner, D., "E-Mail Message to Greg Prior", *Guthrie Exhibit 2059, Board of Patent Appeals and Interferences* (Interference No. 105,393), (Apr. 16, 2000),1 pg.

Turner, B. P., "Second Declaration of Brian P. Turner", *Espiau Exhibit 1091, Board of Patent Appeals and Interferences* (Interference No. 105,393), (Sep. 19, 2006),2 pgs.

Vu, D. H., "Notice of Allowability for "Plasma Lamp With Dielectric Waveguide", U.S. Appl. No. 09/809,718, filed Mar. 15, 2001", *Espiau Exhibit 1047, Board of Patent Appeals and Interferences* (Interference No. 105,393), (Dec. 12, 2003),3 pgs.

Vu, D. H., "Office Action re: Plasma Lamp With Dielectric Waveguide U.S. Appl. No. 09/809,718, filed Mar. 15, 2001", *Guthrie Exhibit 2087, Board of Patent Appeals and Interferences* (Interference No. 105,393), (Nov. 6, 2002),18 pgs.

Vu, D. H., "Office Communication for U.S. Appl. No. 09/0809718, filed Jul. 18, 2003", *Guthrie Exhibit 2096, Board of Patent Appeals and Interferences* (Interference No. 105,393), (Jul. 18, 2006),2 pgs.

Westberg, D. J., "Response to Office Action Mailed Jun. 17, 2002 (in Improved High Intensity Light Source, U.S. Appl. No. 09/818,092, filed Mar. 26, 20001)", *Espiau Exhibit 1043, Board of Patent Appeals and Interferences* (Interference No. 105,393), (Jun. 5, 2003),27 pgs.

Wharmby, D. O., "Chapter 11—Electrodeless Lamps", In: Lamps & Lighting, 4th Edition, 1997 (Arnold & John Wiley & Sons, Inc., *Espiau Exhibit 1039, Patent Appeals and Interferences* (Interference No. 105,393), (1997),13 pgs.

Wharmby, D. O., "Corrected Third Declaration of David O. Wharmby", *Espiau Exhibit 1083, Board of Patent Appeals and Interferences* (Interference No. 105,393), (Aug. 3, 2006),28 pgs.

Wharmby, D. O., "Curriculum Vitae", *Espiau Exhibit 1038, Board of Patent Appeals and Interferences* (Interference No. 105,393), (Nov. 2005),7 pgs.

Wharmby, D. O., "Declaration", *Espiau Exhibit 1040, Board of Patent Appeals and Interferences* (Interference No. 105,393), (May 2, 2006),20 pgs.

Wharmby, D. O., "Deposition Transcript", *Espiau Exhibit 1061, Board of Patent Appeals and Interferences* (Interference No. 105,393), (Jun. 15, 2006),57 pgs.

Wharmby, D. O., "Electrodeless Lamps for Lighting: A Review", IEE Proceedings-A, vol. 140(6), *Guthrie Exhibit 2085, Board of Patent Appeals and Interferences* (Interference No. 105,393), (Nov. 1993),9 pgs.

Wharmby, D. O., "Errata to the Transcript of the Jun. 15, 2006 Deposition of David O Wharmby", *Espiau Exhibit 1062, Board of Patent Appeals and Interferences* (Interference No. 105,393), (Jul. 7, 2006),4 pgs.

Wharmby, D. O., "Fourth Declaration of David O. Wharmby", *Espiau Exhibit 1084, Board of Patent Appeals and Interferences* (Interference No. 105,393), (Aug. 31, 2006),18 pgs.

Wharmby, D. O., "Second Declaration", *Espiau Exhibit 1058, Board of Patent Appeals and Interferences* (Interference No. 105,393), (May 23, 2006),5 pgs.

Wilson, D., "Declaration", *Guthrie Exhibit 2034, Board of Patent Appeals and Interferences* (Interference No. 105,393), (Dec. 12, 2005),3 pgs.

Wilson, D., et al., "Electrode-Less Metal Halide Plasma Lamp With Integrated Electronics", U.S. Appl. No. 60/224,290, filed Aug. 10, 2000 (*Guthrie Exhibit 2052, Board of Patent Appeals and Interferences* (Interference No. 105,393)).

Wilson, D., "Guthrie Declaration of Donald Wilson", *Guthrie Exhibit 2039, Board of Patent Appeals and Interferences* (Interference No. 105,393), (Feb. 18, 2006),10 pgs.

Wilson, D., et al., "High Temperature, Low Cost Window Sealing Technique for Plasma Lamps", U.S. Appl. No. 60/224,291, filed Aug. 10, 2000 (*Guthrie Exhibit 2053, Board of Patent Appeals and Interferences* (Interference No. 105,393)).

"U.S. Appl. No. 60/337,057 Application Filing Material", (Nov. 6, 2001),8 pgs.

"U.S. Appl. No. 09/818,092—Revocation of Power of Attorney with New Power of Attorney and Change of Correspondence Address", *Espiau Exhibit 1256, Board of Patent Appeals and Interferences*(Interference No. 105,393), (Aug. 3, 2005),3 pgs.

"Combination Diagram", *Espiau Exhibit 1270, Board of Patent Appeals and Interferences*(Interference No. 105,393), (Jul. 8, 2000),1 pg.

"Decision—Interlocutory Motions—Bd.R. 125(b)", *Guthrie v. Espiau, Board of Patent Appeals and Interferences* (Interference No. 105,393), (Sep. 20, 2007),3 pgs.

"Decision—Interlocutory Motions—Bd.R. 125(b)", *Guthrie v. Espiau, Board of Patent Appeals and Interferences* (Interference No. 105,393), (Oct. 16, 2007),3 pgs.

"Deposition of Benjamin Glenn", *Espiau Exhibit 1260, Guthrie v. Espiau, Board of Patent Appeals and Interferences* (Interference No. 105,393), (Sep. 18, 2007),66 pgs.

"Deposition of Ellen Thotus", *Espiau Exhibit 1259, Guthrie v. Espiau, Board of Patent Appeals and Interferences* (Interference No. 105,393), (Sep. 17, 2007),42 pgs.

"Deposition of Penny Ortega", *Espiau Exhibit 1261, Guthrie v. Espiau, Board of Patent Appeals and Interferences* (Interference No. 105,393), (Sep. 18, 2007),24 pgs.

"Errata to the Transcript of the Sep. 17, 2007 Deposition of Ellen Thotus", *Espiau Exhibit 1264, Guthrie v. Espiau, Board of Patent Appeals and Interferences* (Interference No. 105,393), (Sep. 26, 2007),3 pgs.

"Errata to the Transcript of the Sep. 18, 2007 Deposition of Benjamin Glenn", *Espiau Exhibit 1263, Guthrie v. Espiau, Board of Patent Appeals and Interferences* (Interference No. 105,393), (Sep. 27, 2007),3 pgs.

"Espiau List of Exhibits", *Guthrie v. Espiau, Board of Patent Appeals and Interferences* (Interference No. 105,393), (Oct. 11, 2007),15 pgs.

"Espiau Miscellaneous Motion 8 (to Exclude Exhibits 2240 and 2242, and to Strike Exhibit 2244 and Corresponding Portions of Guthrie Reply 7 and Guthrie Substitute Reply 7)", *Guthrie v. Espiau, Board of Patent Appeals and Interferences* (Interference No. 105,393), (Oct. 11, 2007),32 pgs.

"Espiau Reply 7", *Guthrie v. Espiau, Board of Patent Appeals and Interferences* (Interference No. 105,393), (Sep. 28, 2007),129 pgs.

"Espiau Second Declaration of F. Matthew Espiau", *Espiau Exhibit 1257, Board of Patent Appeals and Interferences*(Interference No. 105,393), (Sep. 17, 2007),5 pgs.

"Espiau Second Declaration of Matthew Argenti", *Espiau Exhibit 1271, Board of Patent Appeals and Interferences*(Interference No. 105,393), (Oct. 10, 2007),5 pgs.

"Espiau Third Declaration of Brian P. Turner", *Espiau Exhibit 1262, Board of Patent Appeals and Interferences*(Interference No. 105,393), (Sep. 25, 2007),4 pgs.

"Espiau's Objections to Guthrie's Exhibits Served with its Reply 7", *Espiau Exhibit 1273, Guthrie v. Espiau, Board of Patent Appeals and Interferences* (Interference No. 105,393), (Oct. 5, 2007),12 pgs.

"Faxing 2 page Application to Lease 646 University Ave.", *Espiau Exhibit 1255, Board of Patent Appeals and Interferences*(Interference No. 105,393), To Vito Modugno From George Thotus,(Jul. 21, 2000),1 pg.

"Guthrie Declaration of James E. King, Esq.", *Guthrie Exhibit 2244, Board of Patent Appeals and Interferences* (Interference No. 105,393), (Sep. 27, 2007),13 pgs.

"Guthrie Declaration of Ray Paquette", *Guthrie Exhibit 2241, Board of Patent Appeals and Interferences* (Interference No. 105,393), (Sep. 30, 2007),22 pgs.

"Guthrie Motion 8 (To Exclude Evidence)", *Guthrie v. Espiau, Board of Patent Appeals and Interferences* (Interference No. 105,393), (Oct. 10, 2007),49 pgs.

"Guthrie Reply 7", *Guthrie v. Espiau, Board of Patent Appeals and Interferences* (Interference No. 105,393), (Sep. 28, 2007),176 pgs.

"Guthrie Second Declaration of Joe Bennett", *Guthrie Exhibit 2240, Board of Patent Appeals and Interferences* (Interference No. 105,393), (Sep. 24, 2007),5 pgs.

"Guthrie Sixth Declaration of Madhu S. Gupta PhD", *Guthrie Exhibit 2243, Board of Patent Appeals and Interferences* (Interference No. 105,393), (Sep. 27, 2007),24 pgs.

"Guthrie Third Declaration of Charles Guthrie", *Guthrie Exhibit 2242, Board of Patent Appeals and Interferences* (Interference No. 105,393), (Sep. 26, 2007),8 pgs.

"Guthrie's Objections to Espiau's Evidence", *Guthrie Exhibit 2250, Board of Patent Appeals and Interferences* (Interference No. 105,393), (Aug. 14, 2007),3 pgs.

"Guthrie's Objections to Espiau's Exhibits 1255 and 1256", *Guthrie Exhibit 2252, Board of Patent Appeals and Interferences* (Interference No. 105,393), (Sep. 24, 2007),2 pgs.

"Guthrie's objections to Espiau's exhibits served with its opposition 7", *Guthrie Exhibit 2251, Board of Patent Appeals and Interferences* (Interference No. 105,393), (Sep. 10, 2007),10 pgs.

"Guthrie's Objections to Espiau's Exhibits Served with its Reply 7", *Guthrie Exhibit 2253, Board of Patent Appeals and Interferences* (Interference No. 105,393), (Oct. 1, 2007),4 pgs.

"Guthrie's Objections to Espiau's Motion 7 Evidence", *Guthrie Exhibit 2249, Board of Patent Appeals and Interferences* (Interference No. 105,393), (Aug. 7, 2007),35 pgs.

"Guthrie's Objections to Espiau's Opposition 6 Evidence", *Guthrie Exhibit 2248, Board of Patent Appeals and Interferences* (Interference No. 105,393), (Jun. 5, 2007),13 pgs.

"King Declaration E-Mail", *Espiau Exhibit 1272, Board of Patent Appeals and Interferences*(Interference No. 105,393), From Robert Morgan to Nicola Pisano,(Oct. 1, 2007),1 pg.

"Photograph of basement of 644 University Avenue, Los Gatos, California", *Espiau Exhibit 1267, Board of Patent Appeals and Interferences*(Interference No. 105,393), (No date listed),1 pg.

"Photograph of basement of 644 University Avenue, Los Gatos, California", *Espiau Exhibit 1268, Board of Patent Appeals and Interferences*(Interference No. 105,393), (No date listed),1 pg.

"Photograph of basement of 644 University Avenue, Los Gatos, California", *Espiau Exhibit 1269, Board of Patent Appeals and Interferences*(Interference No. 105,393), (No date listed),1 pg.

"Picture of Facade of Building #644", *Espiau Exhibit 1265, Board of Patent Appeals and Interferences*(Interference No. 105,393), (No date listed),1 pg.

"Sketch of basement of 644 University Avenue, Los Gatos, California", *Espiau Exhibit 1266, Board of Patent Appeals and Interferences*(Interference No. 105,393), (No date listed),1 pg.

"Sound Deposition Services, Inc. Transcript", *Guthrie Exhibit 2247, Board of Patent Appeals and Interferences* (Interference No. 105,393), The transcript was derived from the video located at http://www.redherring.tv/luxim.htm,(Sep. 11, 2007),11 pgs.

"Teleconference Transcript for Call before Judge James Moore", *Guthrie v. Espiau, Board of Patent Appeals and Interferences* (Interference No. 105,393), (Oct. 4, 2007),22 pgs.

"Teleconference Transcript for Call before Judge Sally C. Medley", *Guthrie Exhibit 2245, Board of Patent Appeals and Interferences* (Interference No. 105,393), (Aug. 1, 2007),30 pgs.

"Teleconference Transcript for Call before Judge Sally C. Medley", *Guthrie v. Espiau, Board of Patent Appeals and Interferences* (Interference No. 105,393), (Mar. 8, 2007),27 pgs.

"Teleconference Transcript for Call before Judge Sally C. Medley", *Guthrie v. Espiau, Board of Patent Appeals and Interferences* (Interference No. 105,393), (Oct. 15, 2007),26 pgs.

"A Ceramic Wave-Guide Lamp—From a Concept to Reality", *Espiau Exhibit 1208, Board of Patent Appeals and Interferences*(Interference No. 105,393), (Aug. 4, 2000),12 pgs.

"An Integrated Lamp—Waveguide Concept", *Espiau Exhibit 1032, Board of Patent Appeals and Interferences*(Interference No. 105,393), (Jul. 11, 2000),13 pgs.

"U.S. Appl. No. 11/083,559, Preliminary Admendment filed Jul. 15, 2005", 4 pgs.

"U.S. Appl. No. 09/809,718, Admendments Under 37 C.F.R. Sec. 1.312 mailed Dec. 15, 2003", 9 pgs.

"U.S. Appl. No. 10/356,340, Non-Final Office Action mailed Jun. 10, 2004", 6 pgs.

"U.S. Appl. No. 10/356,340, Notice of Allowance mailed Oct. 21, 2004", 4 pgs.

"U.S. Appl. No. 10/356,340, Notice of Allowance mailed Feb. 23, 2005", 4 pgs.

"U.S. Appl. No. 10/356,340, Reply filed Oct. 7, 2004 to Office Action mailed Jun. 10, 2004", 95 pgs.

"U.S. Appl. No. 10/947,800 Non Final Office Action mailed Jul. 12, 2007", 16 pgs.

"U.S. Appl. No. 11/010,093 Non Final Office Action mailed Apr. 4, 2007", 22 pgs.

"U.S. Appl. No. 11/010,093 Non Final Office Action mailed Jun. 14, 2006", 25 pgs.

"U.S. Appl. No. 11/010,093 Response filed Dec. 13, 2006 to Non Final Office Action mailed Jun. 14, 2006", 13 pgs.

"U.S. Appl. No. 10/771,788 Non-Final Action mailed Mar. 27, 2007", 4 pgs.

"U.S. Appl. No. 10/771,788 Non-Final Action mailed Jun. 19, 2006", 5 pgs.

"U.S. Appl. No. 10/771,788 Response filed Sep. 27, 2007 to Ex Parte Quayle Action mailed on Mar. 27, 2007", 8 pgs.

U.S. Appl. No. 10/771,788 Amendment and Response filed Dec. 18, 2006 to Non-Final Office Action mailed Jun. 19, 2006.

"U.S. Appl. No. 11/083,552 Non Final Office Action mailed Aug. 10, 2007",34 pgs.

"U.S. Appl. No. 11/083,552 Preliminary Amendment filed Jul. 15, 2005", 4 pgs.

"U.S. Appl. No. 11/083,557 Non Final Office Action mailed Aug. 30, 2006", 18 pgs.

"U.S. Appl. No. 11/083,557 Notice of Allowance mailed May 3, 2007", 19 pgs.

"U.S. Appl. No. 11/083,557 Preliminary Amendment filed Jul. 15, 2005", 4 pgs.

"U.S. Appl. No. 11/083,557 Response filed Jan. 19, 2007 to Non Final Office Action mailed Aug. 30, 2006", 13 pgs.

"U.S. Appl. No. 11/084,069, Non-Final Office Action mailed Aug. 9, 2007", 35 pgs.

"U.S. Appl. No. 11/084,177 Non Final Office Action mailed Aug. 9, 2007", ,34 pgs.

"U.S. Appl. No. 11/084,177 Preliminary Amendment filed Jul. 15, 2005", 4 pgs.

"U.S. Appl. No. 11/618,673 Preliminary Amendment filed Dec. 29, 2006", 8 pgs.

"Channel Microwave Quote No. 100102 re: Various Items", *Espiau Exhibit 1162, Board of Patent Appeals and Interferences*(Interference No. 105,393), (May 18, 200),2 pgs.

"Complaint for Damages and Injunctive and Other Relief", *Guthrie Exhibit 2229, Board of Patent Appeals and Interferences* (Interference No. 105,393), (Oct. 23, 2001),38 pgs.

"Conference Call", *Guthrie Exhibit 2230, Board of Patent Appeals and Interferences* (Interference No. 105,393), (Feb. 9, 2006),25 pgs.

"Conference Call", *Guthrie Exhibit 2225, Board of Patent Appeals and Interferences* (Interference No. 105,393), (Mar. 8, 2007),24 pgs.

"Coorstek Quotation", *Espiau Exhibit 1197, Board of Patent Appeals and Interferences*(Interference No. 105,393), (Aug. 2, 2000),3 pgs.

"Cross-Examination of Carl W., Pobanz", *Espiau Exhibit 1236, Board of Patent Appeals and Interferences* (Interference No. 105,393), Merrill Legal Solutions,(Aug. 19, 2007),68 pgs.

"Cross-Examination of David Pozar", *Espiau Exhibit 1063, Board of Patent Appeals and Interferences*(Interference No. 105,393), (Jun. 19, 2006),196 pgs.

"Cross-Examination of Matt Espiau (Videotaped )", *Espiau Exhhibit 1239, Board of Patent Appeals and Interferences*(Interference No. 105,393), Merrill Legal Solutions,(Aug. 17, 2007),225 pgs.

"Declaration of Carl W. Pobanz", *Espiau Exhibit 1030, Board of Patent Appeals and Interferences*(Interference No. 105,393), (Apr. 27, 2006),7 pgs.

"Declaration of Chandrashekhar J. Joshi", *Espiau Exhibit 1051, Board of Patent Appeals and Interferences*(Interference No. 105,393), (May 22, 2006),3 pgs.

"Declaration of David Turner", *Espiau Exhibit 1034, Board of Patent Appeals and Interferences*(Interference No. 105,393), (Apr. 27, 2006),5 pgs.

"Declaration of Ellen Thotus", *Espiau Exhibit 1242, Board of Patent Appeals and Interferences* (Interference No. 105,393), (Aug. 29, 2007),3 pgs.

"Declaration of Frederick Matthew Espiau", *Guthrie Exhibit 2227, Board of Patent Appeals and Interferences* (Interference No. 105,393), (Jun. 9, 2000),68 pgs.

"Declaration of Frederick Matthew Espiau", *Espiau Exhibit 1168, Board of Patent Appeals and Interferences*(Interference No. 105,393), (Jul. 29, 2007),17 pgs.

"Declaration of Penny Ortega", *Espiau Exhibit 1244, Board of Patent Appeals and Interferences* (Interference No. 105,393), (Aug. 29, 2007),3 pgs.

"Declaration of Regis C. Worley, Jr.", *Guthrie Exhibit 2234, Board of Patent Appeals and Interferences* (Interference No. 105,393), (Aug. 20, 2007),3 pgs.

"Deposition (video transcript) of Chandrashekhar Joshi, M.D.", *Espiau Exhibit 1234, Board of Patent Appeals and Interferences*(Interference No. 105,393), Merrill Legal Solutions,(Aug. 13, 207),152 pgs.

"Deposition of Anthony Cooper", *Guthrie Exhibit 2218, Board of Patent Appeals and Interferences* (Interference No. 105,393), (Aug. 9, 2007),27 pgs.

"Deposition of Chandrashekhar J. Joshi", *Espiau Exhibit 1068, Board of Patent Appeals and Interferences*(Interference No. 105,393), (Jul. 7, 2006),139 pgs.

"Deposition of Charles Guthrie", *Guthrie Exhibit 2222, Board of Patent Appeals and Interferences* (Interference No. 105,393), (Aug. 14, 2007),23 pgs.

"Deposition of David B. Turner", *Espiau Exhibit 1237 Board of Patent Appeals and Interferences* (Interference No. 105,393), Merrill Legal Services,(Aug. 20, 2007),201 pgs.

"Deposition of David Smoler", *Guthrie Exhibit 2223, Board of Patent Appeals and Interferences* (Interference No. 105,393), (Aug. 15, 2007),19 pgs.

"Deposition of Dennis R. Nunes", *Guthrie Exhibit 2214, Board of Patent Appeals and Interferences* (Interference No. 105,393), (Aug. 6, 2007,24 pgs.

"Deposition of Donald M. Wilson", *Guthrie Exhibit 2215, Board of Patent Appeals and Interferences* (Interference No. 105,393), (Aug. 6, 2007,77 pgs.

"Deposition of Floyd Pothoven", *Guthrie Exhibit 2219, Board of Patent Appeals and Interferences* (Interference No. 105,393), (Aug. 9, 2007),23 pgs.

"Deposition of Gregory Prior", *Guthrie Exhibit 2216, Board of Patent Appeals and Interferences* (Interference No. 105,393), (Aug. 7, 2007),43 pgs.

"Deposition of Joseph Bennett", *Guthrie Exhibit 2221, Board of Patent Appeals and Interferences* (Interference No. 105,393), (Aug. 12, 2007),17 pgs.

"Deposition of Madhu S. Gupta, Ph.D.", *Guthrie Exhibit 2220, Board of Patent Appeals and Interferences* (Interference No. 105,393), (Aug. 10, 2007),38 pgs.

"Deposition of Shelby Katz", *Guthrie Exhibit 2224, Board of Patent Appeals and Interferences* (Interference No. 105,393), (Aug. 16, 2007),15 pgs.

"Deposition of Vivek Gandhi", *Guthrie Exhibit 2217, Board of Patent Appeals and Interferences* (Interference No. 105,393), (Aug. 8, 2007),14 pgs.

"Diagram", *Guthrie Exhibit 2205, Board of Patent Appeals and Interferences*(Interference No. 105,393), (No date listed),1 pg.

"Diagram", *Guthrie Exhibit 2200, Board of Patent Appeals and Interferences*(Interference No. 105,393), (No date listed),1 pg.

"Dielectric Resonator Concept for Plasma Lamps", *Espiau Exhibit 1138, Board of Patent Appeals and Interferences*(Interference No. 105,393), (Apr. 20, 2000),5 pgs.

"DRI—Tenco Team Plasma Lamp Business Model", *Espiau Exhibit 1145, Board of Patent Appeals and Interferences*(Interference No. 105,393), (prior to Jul. 30, 2007),1 pg.

"DRI Schematic", *Espiau Exhibit 1132, Board of Patent Appeals and Interferences*(Interference No. 105,393), (Jul. 30, 2007),2 pgs.

"E-mail to D. Turner et al", *Espiau Exhibit 1228, Board of Patent Appeals and Interferences*(Interference No. 105,393), (May 14, 2002),1 pg.

"E-mail to Espiau re: Lamp Project", *Espiau Exhibit 1226, Board of Patent Appeals and Interferences*(Interference No. 105,393), (Apr. 23, 2002),1 pg.

"E-mail to Espiau re: Meeting", *Espiau Exhibit 1227, Board of Patent Appeals and Interferences*(Interference No. 105,393), (Apr. 26, 2002),1 pg.

"E-mail to Nicola A Pisano", *Guthrie Exhibit 2232, Board of Patent Appeals and Interferences* (Interference No. 105,393), (May 23, 2007),1 pg.

"E-mail to Nicola A Pisano", *Guthrie Exhibit 2233, Board of Patent Appeals and Interferences* (Interference No. 105,393), (Aug. 21, 2007),1 pg.

"E-mail to Wayne Catlett et al, re Lamp Schedule", *Espiau Exhibit 1224, Board of Patent Appeals and Interferences*(Interference No. 105,393), (Jul. 21, 2000),1 pg.

"Errata to the transcript of the Aug. 13, 2007 deposition of Chandrashekhar J. Joshi", *Espiau Exhibit 1235, Board of Patent Appeals and Interferences* (Interference No. 105,393), (Aug. 28, 2007),5 pgs.

"Errata to the transcript of the Aug. 14, 2007 deposition of Charles Guthrie", *Guthrie Exhibit 2238, Board of Patent Appeals and Interferences* (Interference No. 105,393), (Aug. 30, 2007),3 pgs.

"Errata to the transcript of the Aug. 15, 2007 deposition of David Smoler", *Guthrie Exhibit 2237, Board of Patent Appeals and Interferences* (Interference No. 105,393), (Aug. 29, 2007),3 pgs.

"Errata to the transcript of the Aug. 17, 2007 Deposition of Frederick "Matt" Espiau", *Espiau Exhibit 1240, Board of Patent Appeals and Interferences* (Interference No. 105,393), (Aug. 28, 2007),4 pgs.

"Errata to the transcript of the Aug. 20, 2007 Deposition of David B. Turner", *Espiau Exhibit 1238, Board of Patent Appeals and Interferences* (Interference No. 105,393), (Aug. 27, 2007),3 pgs.

"Errata to the transcript of the Aug. 6, 2007 deposition of Donald M. Wilson", *Guthrie Exhibit 2236, Board of Patent Appeals and Interferences* (Interference No. 105,393), (Aug. 29, 2007),3 pgs.

"Errata to the transcript of the Aug. 9, 2007 Deposition of Anthony Cooper", *Guthrie Exhibit 2239, Board of Patent Appeals and Interferences* (Interference No. 105,393), (Aug. 30, 2007),3 pgs.

"Errata to the transcript of the Aug. 9, 2007 of Floyd Pothoven", *Guthrie Exhibit 2235, Board of Patent Appeals and Interferences* (Interference No. 105,393), (Aug. 29, 2007),3 pgs.

"Espiau Motion 7 for Priority", *Guthrie, et al. v. Espiau, et al., Board of Patent Appeals and Interferences* (Interference No. 105,393), (Jul. 30, 2007),94 pgs.

"Espiau notice of depositon for cross examination and intent to vido record the deposition of Dennis Nunes", *Espiau Exhibit 1223, Board of Patent Appeals and Interferences*(Interference No. 105,393), (Aug. 6, 2007),3 pgs.

"Espiau Opposition 7 (to Guthrie Priority Motion 7)", *Espiau, Board of Patent Appeals and Interferences* (Interference No. 105,393), (Aug. 31, 2007),121 pgs.

"Espiau Third Declaration of David B. Turner", *Espiau Exhibit 1233, Board of Patent Appeals and Interfereces* (Interference No. 105,393), (Aug. 21, 2007),10 pgs.

"Experiment 1: Cavity Resonator, School of Engineering and Applied Science", *Espiau Exhibit 1026, Board of Patent Appeals and Interferences*(Interference No. 105,393), (Winter, 1995),5 pgs.

"Experiment 3: Cavity Resonator, School of Engineering and Applied Science", *Espiau Exhibit 1025, Board of Patent Appeals and Interferences*(Interference No. 105,393), (Oct. 24, 1990),15 pgs.

"Fifth Declaration of David M. Pozar", *Espiau Exhibit 1183, Board of Patent Appeals and Interferences*(Interference No. 105,393), (Jul. 30, 2007),17 pgs.

"Financial Ledger", *Espiau Exhibit 1241, Board of Patent Appeals and Interferences* (Interference No. 105,393), (1999-2001),3 pgs.

"FWH of U.S. Appl. No. 60/222,028 for Plasma Lamp", *Espiau Exhibit 1012, Board of Patent Appeals and Interferences*(Interference No. 105,393), 28 pgs.

"Graph With Handwritten Notes", *Espiau Exhibit 1155, Board of Patent Appeals and Interferences*(Interference No. 105,393), (prior to Jul. 30, 2007),3 pgs.

"Guthrie Exhibit List", *Espiau, Board of Patent Appeals and Interferences* (Interference No. 105,393), (Aug. 31, 2007),13 pgs.

"Guthrie Opposition 7", *Espiau, Board of Patent Appeals and Interferences* (Interference No. 105,393), (Aug. 31, 2007),122 pgs.

"Handwitten Provisional Draft for An Integrated Lamp Waveguide Concept", *Espiau Exhibit 1031, Board of Patent Appeals and Interferences*(Interference No. 105,393), (Jul. 30, 2007),13 pgs.

"Handwritten Notes re: Discussion with Wayne, Ingmar, David and Chan", *Espiau Exhibit 1207, Board of Patent Appeals and Interferences*(Interference No. 105,393), (prior to Jul. 30, 2007),1 pg.

"http://www.laseraware.com/history.html", *Guthrie Exhibit 2206, Board of Patent Appeals and Interferences*(Interference No. 105,393), (Apr. 11, 2006),1 pg.

"In Re Digital Reflections, Inc.—Chapter 7 Bankruptcy", *Espiau Exhibit 1243, Board of Patent Appeals and Interferences* (Interference No. 105,393), (May 28, 2002),57 pgs.

"Invoice relating to DRI Plasma Lamp Project", *Exhibit 1219, Board of Patent Appeals and Interferences*(Interference No. 105,393), (Jun. 6, 2000),3 pgs.

"IPLDWC Design I Drawings", *Espiau Exhibit 1180, Board of Patent Appeals and Interferences*(Interference No. 105,393), (Jul. 14, 2000),2 pgs.

"Luxim Corporation Project Summit", *Guthrie Exhibit 2201, Board of Patent Appeals and Interferences*(Interference No. 105,393), (Jun. 17, 2007),20 pgs.

"MasterCard Statement—TravelersBank", *Espiau Exhibit 1027, Board of Patent Appeals and Interferences*(Interference No. 105,393), (Apr. 2000),1 pg.

"May 21, 2007 Hearing", *Guthrie Exhibit 2231, Board of Patent Appeals and Interferences* (Interference No. 105,393), (May 21, 2007),33 pgs.

"Miscellaneous Handwritten Notes", *Espiau Exhibit 1213, Board of Patent Appeals and Interferences*(Interference No. 105,393), (prior to Jul. 30, 2007),1 pg.

"Miscellaneous Handwritten Notes", *Espiau Exhibit 1189, Board of Patent Appeals and Interferences*(Interference No. 105,393), (Jul. 28, 2000),2 pgs.

"Miscellaneous Handwritten Notes", *Espiau Exhibit 1153, Board of Patent Appeals and Interferences*(Interference No. 105,393), (May 3, 2000),4 pgs.

"Miscellaneous Handwritten Notes", *Espiau Exhibit 1137, Board of Patent Appeals and Interferences*(Interference No. 105,393), (Apr. 20, 2003),3 pgs.

"Miscellaneous Handwritten Notes", *Espiau Exhibit 1169, Board of Patent Appeals and Interferences*(Interference No. 105,393), (Jun. 12, 2000),1 pg.

"Miscellaneous Handwritten Notes", *Espiau Exhibit 1190, Board of Patent Appeals and Interferences*(Interference No. 105,393), (Jul. 28, 2000),2 pgs.

"Notebook Pages from Matt Espiau", *Espiau Exhibit 1127, Board of Patent Appeals and Interferences*(Interference No. 105,393), (Apr. 27, 2000),13 pgs.

"Notebook Pages from Yian Chang", *Espiau Exhibit 1126, Board of Patent Appeals and Interferences*(Interference No. 105,393), (Aug. 2000),57 pgs.

"Notes", *Espiau Exhibit 1229, Board of Patent Appeals and Interferences*(Interference No. 105,393), (May 14, 2002),2 pgs.

"Notes from Meeting with Joshi, Turner, Espiau regarding Review of Samples", *Espiau Exhibit 1209, Board of Patent Appeals and Interferences*(Interference No. 105,393), (Aug. 8, 2000),2 pgs.

"Notes re: Alumina Puck and Testing of Puck", *Espiau Exhibit 1125, Board of Patent Appeals and Interferences*(Interference No. 105,393), (Aug. 8, 2000),143 pgs.

"Notes Regarding Lighting of Lamp", *Espiau Exhibit 1210, Board of Patent Appeals and Interferences*(Interference No. 105,393), (Aug. 12, 2000),1 pg.

"Patent Disclosure Summary", *Espiau Exhibit 1225, Board of Patent Appeals and Interferences*(Interference No. 105,393), (Apr. 22, 2000),4 pgs.

"Photo"*Guthrie Exhibit 2207, Board of Patent Appeals and Interferences*(Interference No. 105,393), (No date listed),1 pg.

"Photo", *Guthrie Exhibit 2208, Board of Patent Appeals and Interferences*(Interference No. 105,393), (No date listed),1 pg.

"Photo", *Guthrie Exhibit 2213, Board of Patent Appeals and Interferences* (Interference No. 105,393), (Aug. 20, 2007),1 pg.

"Photograph", *Espiau Exhibit 1222, Board of Patent Appeals and Interferences*(Interference No. 105,393), (prior to Jul. 30, 2007),1 pg.

"Photograph", *Espiau Exhibit 1221, Board of Patent Appeals and Interferences*(Interference No. 105,393), (prior to Jul. 30, 2007),1 pg.

"Schematic", *Espiau Exhibit 1173, Board of Patent Appeals and Interferences*(Interference No. 105,393), (prior to Jul. 30, 2007),1 pg.

"Schematic re: Plasma Lamp Concept", *Espiau Exhibit 1150, Board of Patent Appeals and Interferences*(Interference No. 105,393), (prior to Jul. 30, 2007),1 pg.

"Schematics re: Retangular Waveguide", *Espiau Exhibit 1166, Board of Patent Appeals and Interferences*(Interference No. 105,393), (Jun. 6, 2000),2 pgs.

"Second Declaration of Carl W. Pobanz", *Espiau Exhibit 1054, Board of Patent Appeals and Interferences*(Interference No. 105,393), (May 20, 2006),3 pgs.

"Second Declaration of Chandrashekhar J. Joshi", *Espiau Exhibit 1160, Board of Patent Appeals and Interferences*(Interference No. 105,393), (Jul. 29, 2007),15 pgs.

"Second Declaration of David B. Turner", *Espiau Exhibit 1158, Board of Patent Appeals and Interferences*(Interference No. 105,393), (Jul. 24, 2007),19 pgs.

"Sixth Declaration of David M. Pozar", *Espiau Exhibit 1254, Board of Patent Appeals and Interferences* (Interference No. 105,393), (Aug. 31, 2007),15 pgs.

"Sound Deposition Services, Inc., Guthrie vs. Espiau: Exhibit 1211", *Guthrie Exhibit 2226, Board of Patent Appeals and Interferences* (Interference No. 105,393), (Aug. 23, 2007),14 pgs.

"The Center for High Frequency Electronics", *Guthrie Exhibit 2228, Board of Patent Appeals and Interferences* (Interference No. 105,393), http://www.chfe.ee.ucla.edu/8/26/2007,(2007),1 pg.

"Trip Report—Chan, Don, Matt", *Espiau Exhibit 1220, Board of Patent Appeals and Interferences*(Interference No. 105,393), (Jul. 30, 2007),1 pg.

"Turner Engineering Purchase Order T62801 / Trade References / T. Weaver's Quote", *Espiau Exhibit 1175, Board of Patent Appeals and Interferences*(Interference No. 105,393), (prior to Jul. 30, 2007),3 pgs.

"United States Securities and Exchange Commission Form D", *Guthrie Exhibit 2202, Board of Patent Appeals and Interferences*(Interference No. 105,393), (May 16, 2007),6 pgs.

Brougher, S. , "E-Mail to D. Turner re: Lamp Project Schedule", *Espiau Exhibit 1146, Board of Patent Appeals and Interferences*(Interference No. 105,393), (Apr. 17, 2000),1 pg.

Catlett, W. , "E-Mail to D. Turner re: DRI Luxim Waveguide Project", *Espiau Exhibit 1186, Board of Patent Appeals and Interferences*(Interference No. 105,393), (Jul. 22, 2000),2 pgs.

Chang, Y. , "E-Mail to D. Turner enclosing June Invoice", *Espiau Exhibit 1177, Board of Patent Appeals and Interferences*(Interference No. 105,393), (Jul. 5, 2000),2 pgs.

Chang, Y. , "E-Mail to D. Turner re: Time and Expenses for July", *Espiau Exhibit 1204, Board of Patent Appeals and Interferences*(Interference No. 105,393), (Aug. 1, 2000),14 pgs.

Chang, Y. , "E-Mail to Espiau re: Integrated Lamp Waveguide Concept", *Espiau Exhibit 1192, Board of Patent Appeals and Interferences*(Interference No. 105,393), (Jul. 24, 2000),1 pg.

Chang, Y. , "E-Mail to Espiau re: Lamp Assy. Figures", *Espiau Exhibit 1201, Board of Patent Appeals and Interferences*(Interference No. 105,393), (Jul. 30, 2000),3 pgs.

Chang, Y., "E-Mail to J. Chandrashekhar, et al. re: Integrated Lamp Waveguide Concept", *Espiau Exhibit 1200, Board of Patent Appeals and Interferences*(Interference No. 105,393), (Jul. 30, 2000),1 pg.

Chang, Y., "E-Mail to M. Espiau re: Drawings", *Espiau Exhibit 1181, Board of Patent Appeals and Interferences*(Interference No. 105,393), (Jul. 16, 2000),1 pg.

Chang, Y., "E-Mail to M. Espiau re: Integrated Lamp Waveguide Concept w/ Lastest Revisions With Drawings", *Espiau Exhibit 1198, Board of Patent Appeals and Interferences*(Interference No. 105,393), (Jul. 27, 2000),1 pg.

Chang, Y., "E-Mail to M. Espiau re: New Figures / Patent Drawings", *Espiau Exhibit 1194, Board of Patent Appeals and Interferences*(Interference No. 105,393), (Jul. 25, 2000),1 pg.

Chang, Y., "E-Mail to M. Espiau re: Figures / Patent Drawings", *Espiau Exhibit 1193, Board of Patent Appeals and Interferences*(Interference No. 105,393), (Jul. 25, 2000),1 pg.

Chang, Y., "E-Mail to M. Espiau, et al. re: Integrated Lamp Waveguide Concept w/ Latest Revisions With Drawings", *Espiau Exhibit 1196, Board of Patent Appeals and Interferences*(Interference No. 105,393), (Jul. 26, 2000),1 pg.

Chang, Y., "Notes re: The Integrated Dielectric Waveguide Plasma Lamp Concept", *Espiau Exhibit 1152, Board of Patent Appeals and Interferences*(Interference No. 105,393), (2000),32 pgs.

Espiau, M., "E-Mail to D. Turner re: Three Phase Service", *Espiau Exhibit 1176, Board of Patent Appeals and Interferences*(Interference No. 105,393), (Jun. 29, 2000),2 pgs.

Espiau, M., "E-Mail to Y. Chang re: Integrated Lamp Waveguide Concept", *Espiau Exhibit 1199, Board of Patent Appeals and Interferences*(Interference No. 105,393), (Jul. 28, 2000),1 pg.

Espiau, M., "E-Mail to Y. Chang, et al. re: Integrated Lamp Waveguide Concept", *Espiau Exhibit 1195, Board of Patent Appeals and Interferences*(Interference No. 105,393), (Jul. 26, 2000),1 pg.

Espiau, M., "E-Mail to Y. Chang, et al. re: Integrated Lamp Waveguide Concept", *Espiau Exhibit 1191, Board of Patent Appeals and Interferences*(Interference No. 105,393), (Jul. 24, 2000),1 pg.

Espiau, M., "E-Mail to Y. Chang, et al. re: Integrated Lamp Waveguide Concept", *Espiau Exhibit 1182, Board of Patent Appeals and Interferences*(Interference No. 105,393), (Jul. 16, 2000),1 pg.

Espiau, M., "E-Mail to Y. Chang, et al. re: Integrated Lamp Waveguide Concept", *Espiau Exhibit 1179, Board of Patent Appeals and Interferences*(Interference No. 105,393), (Jul. 13, 2000),1 pg.

Guthrie, C., "E-Mail to D. Turner re: Amplifier for Development", *Espiau Exhibit 1144, Board of Patent Appeals and Interferences*(Interference No. 105,393), (May 6, 2000),1 pg.

Guthrie, C., "E-Mail to D. Turner re: Dielectric Constants from Trans Tech", *Espiau Exhibit 1154, Board of Patent Appeals and Interferences*(Interference No. 105,393), (May 6, 2000),1 pg.

Guthrie C., "E-Mail to D. Turner re: Visit / Potential Meeting", *Espiau Exhibit 1156, Board of Patent Appeals and Interferences*(Interference No. 105,393), (May 6, 2000),1 pg.

Ishii, T. K., "Microwave Engineering (Second Edition)", *Guthrie Exhibit 2204, Board of Patent Appeals and Interferences*(Interference No. 105,393), (1989),3 pgs.

Ishii, T. K., "Microwave Engineering (Second Edition)", *Espiau Exhibit 1232, Board of Patent Appeals and Interferences*(Interference No. 105,393), (1989),3 pgs.

Joshi, C., "E-Mail to M. Espiau re: ILWC Patent Paper", *Espiau Exhibit 1178, Board of Patent Appeals and Interferences*(Interference No. 105,393), (Jul. 13, 2000),2 pgs.

Mullen, D., "E-Mail to D. Turner re: DRI Meeting", *Espiau Exhibit 1139, Board of Patent Appeals and Interferences*(Interference No. 105,393), (Apr. 20, 2000)1 pg.

Mullen, D., "E-Mail to Joshi, et al. re: First Pass Thermal Model of Lamp Housing (attaching plasma lamp geometry)", *Espaiu Exhibit 1151, Board of Patent Appeals and Interferences*(Interference No. 105,393), (May 1, 2000),2 pgs.

Pozar, David M., "Microwave Engineering, Third Edition", *Espiau Exhibit 1250, Board of Patent Appeals and Interferences* (Interference No. 105,393), From Chapter 2,(2005),10 pgs.

Pozar, David M., "Microwave Engineering, Third Edition", *Espiau Exhibit 1251, Board of Patent Appeals and Interferences* (Interference No. 105,393), Chapter 5—Impedance Matching and Tuning,(2005),46 pgs.

Pozar, David M., "Microwave Engineering, Third Edition", *Espiau Exhibit 1252, Board of Patent Appeals and Interferences* (Interference No. 105,393), Chapter 6, Microwave Resonators,(2005),14 pgs.

Rizzi, Peter A., "Microwave Engineering Passive Circuits", *Espiau Exhibit 1231, Board of Patent Appeals and Interferences*(Interference No. 105,393), (1988),4 pgs.

Turner, D., "E-Mail to D. Mullen confirming DRI Meeting", *Espiau Exhibit 1136, Board of Patent Appeals and Interferences*(Interference No. 105,393), (Apr. 18, 2000),1 pg.

Turner, D., "E-Mail to C. Joshi re: Property Infor", *Espiau Exhibit 1143, Board of Patent Appeals and Interferences*(Interference No. 105,393), (Apr. 25, 2000),2 pgs.

Turner, D., "E-Mail to C. Joshi, et al. re: DRI—Resume, etc.", *Espiau Exhibit 1142, Board of Patent Appeals and Interferences*(Interference No. 105,393), (Apr. 24, 2000),3 pgs.

Turner, D., "E-Mail to C. Joshi, et al. re: Material Specification", *Espiau Exhibit 1167, Board of Patent Appeals and Interferences*(Interference No. 105,393), (Jun. 9, 2000),3 pgs.

Turner, D., "E-Mail to C. Joshi, et al. re: DRI / Luxim Agreements", *Espiau Exhibit 1170, Board of Patent Appeals and Interferences*(Interference No. 105,393), (Jun. 20, 2000),14 pgs.

Turner, D., "E-Mail to C. Joshi, et al. re: First Dielectric Donut Tests", *Espiau Exhibit 1165, Board of Patent Appeals and Interferences*(Interference No. 105,393), (Jun. 8, 2000),1 pg.

Turner, D., "E-Mail to D. Mullen re: Dielectric Constants from Trans Tech", *Espiau Exhibit 1157, Board of Patent Appeals and Interferences*(Interference No. 105,393), (May 6, 2000),1 pg.

Turner, D., "E-Mail to S. Brougher re: DRI Plasma Lamp Schedule Update", *Espiau Exhibit 1147, Board of Patent Appeals and Interferences*(Interference No. 105,393), (Apr. 28, 2000),1 pg.

Turner, D., "E-Mail to S. Brougher re: Lamp Schedule", *Espiau Exhibit 1184, Board of Patent Appeals and Interferences*(Interference No. 105,393), (Jul. 19, 2000),5 pgs.

Turner, D., "E-Mail to S. Brougher, et al. re: DRI Luxim Waveguide Schedule", *Espiau Exhibit 1206, Board of Patent Appeals and Interferences*(Interference No. 105,393), (Aug. 2, 2000),5 pgs.

Turner, D., "E-Mail to W. Catlett re: DRI—Luxim Business Structure", *Espiau Exhibit 1214, Board of Patent Appeals and Interferences*(Interference No. 105,393), (Aug. 29, 2000),2 pgs.

Turner, D., "E-Mail to W. Catlett re: DRI Luxim License Business Structure", *Espiau Exhibit 1217, Board of Patent Appeals and Interferences*(Interference NO. 105,393), (Sep. 13, 2000),2 pgs.

Turner, D., "E-Mail to W. Catlett re: DRI Plasma Lamp Business Meeting", *Espiau Exhibit 1149, Board of Patent Appeals and Interferences*(Interference No. 105,393), (Apr. 28, 2000),6 pgs.

Turner, D., "E-Mail to W. Catlett re: DRI-Tenco Product Development—Next Steps", *Espiau Exhibit 1161, Board of Patent Appeals and Interferences*(Interference No. 105,393), (May 12, 2000),7 pgs.

Turner, D., "E-Mail to W. Catlett re: Plasma Lamp Project", *Espiau Exhibit 1163, Board of Patent Appeals and Interferences*(Interference No. 105,393), (May 22, 2000),1 pg.

Turner, D., "E-Mail to W. Catlett re: DRI—Luxim License Business Structure", *Espiau Exhibit 1215, Board of Patent Appeals and Interferences*(Interference No. 105,393), (Sep. 11, 2000),2 pgs.

Turner, D., "E-Mail to W. Catlett re: DRI—Luxim License Framework", *Espiau Exhibit 1216, Board of Patent Appeals and Interferences*(Interference No. 105,393), (Sep. 11, 2000),2 pgs.

Turner, D., "Memorandum to G. Prior re: Tenco Proposal to Develop a Plasma Lamp Exciter and Waveguide", *Espiau Exhibit 1134, Board of Patent Appeals and Interferences*(Interference No. 105,393), (Apr. 14, 2000),7 pgs.

Turner, D., "Memorandum to G. Prior re: Tenco Engineering Serviice for Digital Reflection", *Espiau Exhibit 1130, Board of Patent Appeals and Interferences*(Interference No. 105,393), (Mar. 31, 2000),10 pgs.

Turner, D., "Memorandum to J. Legge re: Production Engineering for DRI Components", *Espiau Exhibit 1133, Board of Patent Appeals and Interferences*(Interference No. 105,393), (Mar. 31, 2000),5 pgs.

Turner, D., "Memorandum to T. Alton re: Issuing Purchase Order to Kyocera", *Espiau Exhibit 1172, Board of Patent Appeals and Interferences*(Interference No. 105,393), (Jun. 22, 2000),5 pgs.

Turner, D., "Memorandum to W. Catlett re: Business Structures for Joint DRI—Luxim Development", *Espiau Exhibit 1212, Board of Patent Appeals and Interferences*(Interference No. 105,393), (Aug. 10, 2000),3 pgs.

Turner, D., "Memorandum to W. Catlett re: Non-Disclosure Agreement and Interim Product Development Agreement", *Espiau Exhibit 1174, Board of Patent Appeals and Interferences*(Interference No. 105,393), (Jun. 23, 2000),12 pgs.

Turner, D., "Memorandum to W. Catlett re: Termination of Development Activities relating to Projection Light Engine Waveguide Development", *Espiau Exhibit 1218, Board of Patent Appeals and Interferences*(Interference No. 105,393), (Nov. 3, 2000),1 pg.

Turner, D., "Notes", *Espiau Exhibit 1131, Board of Patent Appeals and Interferences*(Interference No. 105,393), (Apr. 11, 2000),3 pgs.

Turner, "Notes", *Espiau Exhibit 1128, Board of Patent Appeals and Interferences*(Interference No. 105,393), (Mar. 6, 2000),1 pg.

Turner, "Notes", *Espiau Exhibit 1129, Board of Patent Appeals and Interferences*(Interference No. 105,393), (Mar. 8, 2000),1 pg.

Turner, "Notes", *Espiau Exhibit 1135, Board of Patent Appeals and Interferences*(Interference No. 105,393), (Apr. 17, 2000),3 pgs.

Turner, "Notes", *Espiau Exhibit 1141, Board of Patent Appeals and Interferences*(Interference No. 105,393), (Apr. 24, 2000),2 pgs.

Turner, "Notes", *Espiau Exhibit 1148, Board of Patent Appeals and Interferences*(Interference No. 105,393), (May 1, 2000),1 pg.

Turner, "Notes from the Jun. 21, 2000 Meeting", *Espiau Exhibit 1171, Board of Patent Appeals and Interferences*(Interference No. 105,393), (Jun. 21, 2000),6 pgs.

Turner, "Notes re: DRI Plasma Light from the the May 9, 2000 Meeting", *Espiau Exhibit 1159, Board of Patent Appeals and Interferences*(Interference No. 105,393), (May 9, 2000),3 pgs.

"Amended Assignment and Bill of Sale", *Guthrie Exhibit 2148, Board of Patent Appeals and Interferences* (Interference No. 105,393), (Jan. 12, 2007), 1 pg.

"Chapter 6.3—Rectangular Waveguide Cavities in: Microwave Engineering, Pozar, D. M., Editor (John Wiley & Sons, Inc.)", *Guthrie Exhibit 2143, Board of Patent Appeals and Interferences* (Interference No. 105,393), 313-318.

"Collection of Correspondence", *Guthrie Exhibit 2163, Board of Patent Appeals and Interferences* (Interference No. 105,393), (2000),23 pgs.

"CoorsTek Engineering Drawings", *Guthrie Exhibit 2142, Board of Patent Appeals and Interferences* (Interference No. 105,393), (Aug. 10, 200),6 pgs.

CoorsTek Invoice No. 1016307, *Guthrie Exhibit 2140, Board of Patent Appeals and Interferences* (Interference No. 105,393, (Oct. 12, 2000), 1 pg.

CoorsTek Invoice No. 1017845, *Guthrie Exhibit 2141, Board of Patent Appeals and Interferences* (Interference No. 105,393, (Oct. 18, 2001), 1 pg.

"Decision—Motions—Bd. R. 125(a) (Paper 83)", *Guthrie, et al. v. Espiau, et al., Board of Patent Appeals and Interferences* (Interference No. 105,393), (Feb. 27, 2007),51 pgs.

"Decision—On Rehearing—Bd. R. 125(c) (Paper 89)", *Guthrie, et al. v. Espiau, et al., Board of Patent Appeals and Interferences* (Interference No. 105,393), (Mar. 20, 2007),13 pgs.

Decision—Rehearing—Bd. R. 127(d) (Paper 94), *Guthrie, et al. v. Espiau, et al., Board of Patent Appeals and Interferences* (Interference No. 105,393), (Apr. 18, 2007),5 pgs.

"Declaration of David Smoler", *Guthrie Exhibit 2136, Board of Patent Appeals and Interferences*(Interference No. 105,393), (Dec. 5, 2005), 17 pgs.

"Declaration of Donald M. Wilson (Corrected)", *Espiau Exhibit 1106, Board of Patent Appeals and Interferences*(Interference No. 105,393), (Dec. 12, 2005),3 pgs.

"Declaration of Tim R. Russell", *Guthrie Exhibit 2145, Board of Patent Appeals and Interferences* (Interference No. 105,393), (Feb. 1, 2006),3 pgs.

"Draft of Charles Guthries' Expense Report", *Guthrie Exhibit 2192, Board of Patent Appeals and Interferences* (Interference No. 105,393), (May 10, 2000),2 pgs.

"E-Mails between C. Guthrie and C. Lee", *Guthrie Exhibit 2167, Board of Patent Appeals and Interferences* (Interference No. 105,393), (2000),6 pgs.

"E-Mails Between T. Russell and T. Kearney", *Guthrie Exhibit 2187, Board of Patent Appeals and Interferences* (Interference No. 105,393), (2006),7 pgs.

"Engineering Sketches (faxed to Coorstek)", *Guthrie Exhibit 2137, Board of Patent Appeals and Interferences*(Interference No. 105,393), (Jul. 20, 2000), 2 pgs.

"Espiau Declaration of Janet Brant", *Espiau Exhibit 1118, Board of Patent Appeals and Interferences*(Interference No. 105,393), (May 25, 2007), 3 pgs.

"Espiau Declaration of Matthew A. Argenti", *Espiau Exhibit 1121, Board of Patent Appeals and Interferences*(Interference No. 105,393), (May 28, 2007),3 pgs.

"Espiau Declaration of Michael J. Murphy", *Espiau Exhibit 1120, Board of Patent Appeals and Interferences*(Interference No. 105,393), (May 29, 2007),4 pgs.

"Espiau Declaration of Terry Kearney", *Espiau Exhibit 1122, Board of Patent Appeals and Interferences*(Interference No. 105,393), (May 28, 2007),6 pgs.

"Espiau Declaration of W. Benjamin Glenn", *Espiau Exhibit 1119, Board of Patent Appeals and Interferences*(Interference No. 105,393), (May 28, 2007),8 pgs.

"Espiau Miscellaneous Motion 6 (Request for Rehearing of Espiau's Request for Leave to Prove Derivation by Guthrie)", *Guthrie, et al. v. Espiau, et al., Board of Patent Appeals and Interferences* (Interference No. 105,393), (Mar. 22, 2007),11 pgs.

"Espiau Opposition 6", *Guthrie, et al. v. Espiau, et al.* (Interference No. 105,393), (May 29, 2007),31 pgs.

"Guthrie Declaration of Anthony Cooper", *Guthrie Exhibit 2184, Board of Patent Appeals and Interferences* (Interference No. 105,393), (Jun. 14, 2007),6 pgs.

"Guthrie Declaration of Dennis R. Nunes", *Guthrie Exhibit 2199, Board of Patent Appeals and Interferences* (Interference No. 105,393), 3 pgs.

"Guthrie Declaration of Floyd Pothoven", *Guthrie Exhibit 2183, Board of Patent Appeals and Interferences* (Interference No. 105,393), (Jun. 15, 2007),5 pgs.

"Guthrie Declaration of Joe Bennett", *Guthrie Exhibit 2186, Board of Patent Appeals and Interferences* (Interference No. 105,393), (Jun. 14, 2007),5 pgs.

"Guthrie Declaration of Shelby Katz", *Guthrie Exhibit 2144, Board of Patent Appeals and Interferences* (Interference No. 105,393), (May 24, 2007),3 pgs.

"Guthrie Declaration of Vivek Gandhi", *Guthrie Exhibit 2164, Board of Patent Appeals and Interferences* (Interference No. 105,393), (May 18, 2007),3 pgs.

"Guthrie Fifth Declaration of Madhu S. Gupta, Ph.D.", *Guthrie Exhibit 2182, Board of Patent Appeals and Interferences* (Interference No. 105,393), (Jun. 14, 2007),23 pgs.

"Guthrie Miscellaneous Motion 6 (To Compel Testimony of Tim Russell)", *Guthrie, et al. v. Espiau, et al., Board of Patent Appeals and Interferences* (Interference No. 105,393), (May 23, 2006), 23 pgs.

"Guthrie Miscellaneous Motion 6 (Request for Rehearing)", *Guthrie, et al. v. Espiau, et al., Board of Patent Appeals and Interferences* (Interference No. 105,393), (Mar. 13, 2007), 11 pgs.

"Guthrie Opposition 6 (Opposing Espiau Motion 6 to Request Rehearing)", *Guthrie, et al. v. Espiau, et al., Board of Patent Appeals and Interferences* (Interference No. 105,393), (Apr. 3, 2007), 12 pgs.

"Guthrie Priority Motion 7", *Guthrie, et al. v. Espiau, et al., Board of Patent Appeals and Interferences* (Interference No. 105,393), (Jun. 15, 2007), 81 pgs.

"Guthrie Second Declaration of Charles Guthrie", *Guthrie Exhibit 2180, Board of Patent Appeals and Interferences* (Interference No. 105,393), (Jun. 14, 2007), 12 pgs.

"Guthrie Second Declaration of David E. Smoler", *Guthrie Exhibit 2150, Board of Patent Appeals and Interferences* (Interference No. 105,393), (May 21, 2007), 8 pgs.

"Guthrie Third Declaration of Donald Wilson", *Guthrie Exhibit 2181, Board of Patent Appeals and Interferences* (Interference No. 105,393), (Jun. 13, 2007), 22 pgs.

"Guthrie Third Declaration of Greg Prior", *Guthrie Exhibit 2185, Board of Patent Appeals and Interferences* (Interference No. 105,393), (Jun. 15, 2007), 11 pgs.

"Guthrie Third Declaration of Nicola Pisano", *Guthrie Exhibit 2189, Board of Patent Appeals and Interferences* (Interference No. 105,393), (May 23, 2007), 8 pgs.
"Manufacturing Order Documentation Form", *Guthrie Exhibit 2139, Board of Patent Appeals and Interferences*(Interference No. 105,393), (Aug. 8, 2000), 3 pgs.
"Manufacturing Quote from Coorstek", *Guthrie Exhibit 2138, Board of Patent Appeals and Interferences*(Interference No. 105,393), (Jul. 27, 2000), 2 pgs.
"Petition to Correct Inventorship in U.S. Appl. No. 09/818,092, filed Mar. 26, 2001", *Guthrie Exhibit 2166, Board of Patent Appeals and Interferences* (Interference No. 105,393), (Dec. 22, 2004), 21 pgs.
"Photograph of Lighted Half-Wavelength", *Guthrie Exhibit 2178, Board of Patent Appeals and Interferences* (Interference No. 105,393), (2002), 2 pgs.
"Photographs of CoorsTek Full Wavelength Ceramic Waveguide", *Guthrie Exhibit 2162, Board of Patent Appeals and Interferences* (Interference No. 105,393), 1 pg.
"Smoler Voicemail Transcript", *Espiau Exhibit 1109, Board of Patent Appeals and Interferences*(Interference No. 105,393), (Nov. 21, 2005), 1 pg.
"Transcript of Deposition of Tim Russell", *Exhibit 2198, Board of Patent Appeals and Interferences* (Interference No. 105,393), (Jun. 6, 2007), 79 pgs.
"Wilson Handwritten Notes", *Espiau Exhibit 1107, Board of Patent Appeals and Interferences*(Interference No. 105,393), (Nov. 7, 2005), 2 pgs.
"Wilson Handwritten Notes", *Espiau Exhibit 1108, Board of Patent Appeals and Interferences*(Interference No. 105,393), (Nov. 15, 2005), 11 pgs.
"Wilson Technical Consulting Agreement", *Espiau Exhibit 1105, Board of Patent Appeals and Interferences*(Interference No. 105,393), (Oct. 17, 2005), 2 pgs.
Bennett, J., "E-Mail to C. Guthrie Re: Kyocera Quote for Waveguide Samples", *Guthrie Exhibit 2176, Board of Patent Appeals and Interferences* (Interference No. 105,393), (Jul. 10, 2000), 1 pg.
Brant, J., "E-Mail to Tony McGettigan", *Espiau Exhibit 1104, Board of Patent Appeals and Interferences*(Interference No. 105,393), (Oct. 20, 2005), 1 pg.
Guthrie, C., "Collection of Waveguide Drawings", *Guthrie Exhibit 2169, Board of Patent Appeals and Interferences* (Interference No. 105,393), (2000), 7 pgs.
Guthrie, C., "D.R.I. Drawing—Ceramic Substrate (SMPL004)", *Guthrie Exhibit 2171, Board of Patent Appeals and Interferences* (Interference No. 105,393), (Jun. 19, 2000), 1 pg.
Guthrie, C., "D.R.I. Drawing—Dielectric Test Sample", *Guthrie Exhibit 2154, Board of Patent Appeals and Interferences* (Interference No. 105,393), (Apr. 26, 2000), 1 pg.
Guthrie, C., "D.R.I. Drawing—High Bright Picture Element (WGC006)", *Guthrie Exhibit 2170, Board of Patent Appeals and Interferences* (Interference No. 105,393), (Jun. 14, 2000) 1 pg.
Guthrie, C., "D.R.I. Drawing—Wave Guide Lamp Concept 3d (WGC003)", *Guthrie Exhibit 2175, Board of Patent Appeals and Interferences* (Interference No. 105,393), (Jul. 3, 2000), 1 pg.
Guthrie, C., "D.R.I. Drawings—R. F. Connector Details (Versions 1 and 2)", *Guthrie Exhibit 2174, Board of Patent Appeals and Interferences* (Interference No. 105,393), (2000), 2 pgs.
Guthrie, C., "D.R.I. Drawings—Wave Guide Lamp Concept 5 (WGC005); Wave Guide Lamp Concept 6 (WGC 006); and Wave Guide Concept 7 (WGC 007)", *Guthrie Exhibit 2172, Board of Patent Appeals and Interferences* (Interference No. 105,393), (Jun. 27, 2000), 3 pgs.
Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthrie Exhibit 2173, Board of Patent Appeals and Interferences* (Interference No. 105,393), (Jun. 28, 2000), 3 pgs.
Guthrie, C., "E-Mail to E. Sandberg, et al. re: Meeting at ITW", *Guthrie Exhibit 2179, Board of Patent Appeals and Interferences* (Interference No. 105,393), (Mar. 23, 2000), 2 pgs.
Joshi, C., "E-Mail to C. Guthrie", *Guthrie Exhibit 2177, Board of Patent Appeals and Interferences* (Interference No. 105,393), (Jul. 13, 2000), 1 pg.

Russell, T., "E-Mail to N. Pisano (Guthrie's Counsel) Re: DRI Patent Application", *Guthrie Exhibit 2188, Board of Patent Appeals and Interferences* (Interference No. 105,393), (May 19, 2007), 2 pgs.
Smoler, D., "E-Mail to C. Guthrie re: Ridged Waveguide Ideas", *Guthrie Exhibit 2149, Board of Patent Appeals and Interferences* (Interference No. 105,393), (Jun. 27, 2000), 2 pgs.
Turner, D., "E-Mail to C. Guthrie re: Dielectric Constants from Trans Tech", *Guthrie Exhibit 2168, Board of Patent Appeals and Interferences* (Interference No. 105,393), (May 7, 2000), 1 pg.
Turner, D., "E-Mail to D. Wilson and C. Guthrie (attaching Lamp Plasma Schedule)", *Guthrie Exhibit 2197, Board of Patent Appeals and Interferences* (Interference No. 105,393), (Jun. 28, 2000), 3 pgs.
Turner, D., "E-Mail to D. Wilson and C. Guthrie re: Wavelength Project List (attaching Updated Contact List)", *Guthrie Exhibit 2159, Board of Patent Appeals and Interferences* (Interference No. 105,393), (Jul. 6, 2000), 3 pgs.
Turner, D., et al., "E-Mail to D. Wilson, et al. Re: DRI Plasma Lamp—Updated Address List", *Guthrie Exhibit 2152, Board of Patent Appeals and Interferences* (Interference No. 105,393), (Apr. 24, 2000), 3 pgs.
Turner, D., "E-Mail to G. Prior Re: DRI Tasks", *Guthrie Exhibit 2165, Board of Patent Appeals and Interferences* (Interference No. 105,393), (Apr. 10, 2000), 2 pgs.
Turner, D., "E-Mail to G. Prior, et al. Re: Action Item List", *Guthrie Exhibit 2157, Board of Patent Appeals and Interferences* (Interference No. 105,393), (Jun. 28, 2000), 2 pgs.
Turner, D., "E-Mail to G. Prior, et al. Re: DRI Plasma Lamp Schedule Update", *Guthrie Exhibit 2156, Board of Patent Appeals and Interferences* (Interference No. 105,393), (Apr. 28, 2000), 4 pgs.
Turner, D., "E-Mail to G. Prior, et al. Re: Proposal to Develop Plasma Lamp Exciter and Waveguide", *Guthrie Exhibit 2151, Board of Patent Appeals and Interferences* (Interference No. 105,393), (Apr. 16, 2000), 8 pgs.
Turner, D., "E-Mail to G. Prior, et al. Re: DRI Plasma Lamp—Laser Bonding", *Guthrie Exhibit 2153, Board of Patent Appeals and Interferences* (Interference No. 105,393), (Apr. 26, 2000), 2 pgs.
Turner, D., et al., "E-Mail to J. Chan, et al. Re: Waveguide Meeting", *Guthrie Exhibit 2195, Board of Patent Appeals and Interferences* (Interference No. 105,393), (Jun. 2, 2000), 1 pg.
Turner, D., "E-Mail to W. Catlett", *Guthrie Exhibit 2160, Board of Patent Appeals and Interferences* (Interference No. 105,393), (Jul. 17, 2000), 2 pgs.
Turner, D., et al., "E-Mail to W. Catlett Re: Lamp Project Budget", *Guthrie Exhibit 2194, Board of Patent Appeals and Interferences* (Interference No. 105,393), (Jun. 1, 2000), 4 pgs.
Turner, D., "E-Mail to W. Catlett Re: Office/Lab and Deposit Account for Lamp Project", *Guthrie Exhibit 2193, Board of Patent Appeals and Interferences* (Interference No. 105,393), (May 31, 2000), 2 pgs.
Turner, D., "E-Mail to W. Catlett re: Luxim Waveguide Status Update", *Guthrie Exhibit 2158, Board of Patent Appeals and Interferences* (Interference No. 105,393), (Jul. 6, 2000), 3 pgs.
Turner, D., "E-Mail to W. Catlett re: Waveguide Lamp Status Report", *Guthrie Exhibit 2161, Board of Patent Appeals and Interferences* (Interference No. 105,393), (Aug. 1, 2000), 2 pgs.
Turner, D., "E-Mail to W. Catlett, et al. Re: Luxim Waveguide Status and Meeting", *Guthrie Exhibit 2196, Board of Patent Appeals and Interferences* (Interference No. 105,393), (Jun. 26, 2000), 2 pgs.
Pisano, N.; Guthrie Miscellaneous Motion 6 (Request for Rehearing) dated Mar. 13, 2007 (11 pp), submitted to the USPTO in Patent Interference No. 105,393, Cited in attached IDS.
Decision—Motions—Bd. R. 125(a) (Paper 83) filed Feb. 27, 2007 (51 pp) by Trial Division Merits Panel (USPTO) in Patent Interference No. 105,393, Cited in attached IDS.
Decision—On Rehearing—Bd. R. 125(c) (Paper 89) filed Mar. 20, 2007 (13 pp) by Trial Division Merits Panel (USPTO) in Patent Interference No. 105,393, Cited in attached IDS.
Morgan, R.C.; Espiau Miscellaneous Motion 6 dated Mar. 22, 2007 (11pp), submitted to the USPTO in Patent Interference No. 105,393, Cited in attached IDS.
Pisano, N.; Guthrie Opposition 6 (Opposing Espiau Motion 6 To Request Rehearing) dated Apr. 3, 2007 (12 pp), submitted to the USPTO in Patent Interference No. 105,393, Cited in attached IDS.

Decision—Rehearing—Bd. R. 127(d) (Paper 94) filed Apr. 18, 2007 (5 pp) by Board of Patent Appeals and Interferences (USPTO) in Patent Interference No. 105,393, Cited in attached IDS.
Brandt email Oct. 20, 2005, Cited in attached IDS.
Wilson Consulting Agreement, Cited in attached IDS.
Corrected Wilson Declaration, Cited in attached IDS.
Wilson handwritten notes Nov. 7, 2005, Cited in attached IDS.
Wilson handwritten notes Nov. 15, 2005, Cited in attached IDS.
Smoler voicemail transcript Nov. 21, 2005, Cited in attached IDS.
Wilson invoice Nov. 2, 2005, Not cited.
Wilson invoice Nov. 11, 2005, Not cited.
Wilson invoice Nov. 14, 2005, Not cited.
Wilson invoice Dec. 26, 2005, Not cited.
Wilson check Nov. 4, 2005, Not cited.
Wilson check Nov. 15, 2005, Not cited.
Wilson check Nov. 22, 2005, Not cited.
Wilson check Jan. 3, 2006, Not cited.
Espiau Declaration of Janet Brant, Cited in attached IDS.
Espiau Declaration of Benjamin Glenn, Cited in attached IDS.
Espiau Declaration of Michael J.Murphy, Cited in attached IDS.
Espiau Declaration of Matthew Argenti, Cited in attached IDS.
Espiau Declaration of Terry Kearney, Cited in attached IDS.
E-mail dated May 25, 2007 from David Bergan to Nicola Pisano re Guthrie Miscellaneous Motion 6, Not cited.
*Ashurst v. Brugger*, Patent Interference No. 105,482, Decision—Miscellaneous Bd.R. 104(a), Not cited.
IPO Appellate/Interference Practice in the New Millennium conference materials: Table of Contents and Tab 6, Not cited.
Declaration of David Smoler executed Dec. 5, 2005, Cited in attached IDS.
Engineering sketches faxed to CoorsTek, Cited in attached IDS.
Manufacturing quote from CoorsTek, Cited in attached IDS.
Manufacturing Order documentation from CoorsTek dated Aug. 8, 2000, Cited in attached IDS.
Invoice from CoorsTek dated Oct. 13, 2000, Cited in attached IDS.
Invoice from CoorsTek dated Oct. 17, 2000, Cited in attached IDS.
CoorsTek engineering drawings numbered 516133 through 516138, Cited in attached IDS.
Chapter 6.3 from David M. Pozar, Microwave Engineering, Second Edition, John Wiley & Sons, Inc. (1998), Cited in attached IDS.
Declaration of Shelby Katz, Cited in attached IDS.
Declaration of Tim Russell dated Feb. 1, 2006 prepared by Wilson Sonsini Goodrich & Rosati, Cited in attached IDS.
David Smoler notebook entries dated Oct. 25, 1999, See pp. A17-A19 in Exhibit 2037 cited in IDS dated Dec. 19, 2006.
Dec. 16, 1999 e-mail form David Smoler to Greg Prior and Ed Sandberg, See A20 in Exhibit 2037 cited in IDS dated Dec. 19, 2006.
Amended Assignment and Bill of Sale dated Jan. 12, 2007, Cited in attached IDS.
Jun. 27, 2000 e-mail from David Smoler to Charles Guthrie, Cited in attached IDS.
Second Declaration of David E. Smoler dated May 21, 2007, Cited in attached IDS.
Apr. 16, 2000 e-mail from David Turner to Greg Prior, Jim Legge and Don Wilson enclosing proposal dated Apr. 14, 2000, Cited in attached IDS.
Apr. 24, 2000 e-mail from David Turner, Cited in attached IDS.
Apr. 26, 2000 e-mail from David Turner to Greg Prior, Cited in attached IDS.
DRI Drawing SPL001, Cited in attached IDS.
DRI Drawing SPL002, See Exhibit 2061 cited in IDS dated Dec. 19, 2006.
Apr. 28, 2000 e-mail form David Turner to Greg Prior, Cited in attached IDS.
Jun. 28, 2000 e-mail from David Turner to Greg Prior, Cited in attached IDS.
Jul. 6, 2000 e-mail from David Turner to Wayne Catlett, Cited in attached IDS.
Jul. 6, 2000 e-mail from David Turner attaching updated contact list, Cited in attached IDS.
Jul. 17, 2000 e-mail from David Turner to Wayne Catlett, Cited in attached IDS.
Aug. 1, 2000 e-mail to from David Turner to Wayne Catlett, Cited in attached IDS.
Photographs of full wavelength waveguide made by Coorstek, Cited in attached IDS.
Collection of correspondence after Aug. 1 between Tenco and DRI, Cited in attached IDS.
Declaration of Vivek Gandhi, Cited in attached IDS.
Apr. 10, 2000 e-mail from David Turner to Greg Prior re: DRI Tasks, Cited in attached IDS.
Petition to Correct Inventorship filed Dec. 22, 2004, Cited in attached IDS.
Apr. 28, 2000 e-mail correspondence between Charles Guthrie and CT Lee, Cited in attached IDS.
May 7, 2000 e-mail from David Turner to Charles Guthrie, Cited in attached IDS.
Collection of waveguide drawings labeled WGC003, Cited in attached IDS.
DRI drawing WGC006, Cited in attached IDS.
DRI drawing SMPL004, Cited in attached IDS.
Collection of irregularly shaped waveguides, Cited in attached IDS.
DRI drawings WGC008, WGC009 and WGC010, Cited in attached IDS.
DRI drawings RFCD001 and RFCD002, Cited in attached IDS.
DRI drawing WGC003 including spring-loaded probe, Cited in attached IDS.
Jul. 10, 2000 e-mail from Joe Bennett to Charles Guthrie, Cited in attached IDS.
Jul. 13, 2000 e-mail form Chan Joshi to Charles Guthrie, Cited in attached IDS.
2002 photograph of lighted half-wavelength waveguide resonator, Cited in attached IDS.
Mar. 23, 2000 e-mail from Charles Guthrie re: Meeting at ITW-Escondido, Cited in attached IDS.
Declaration of Charles Guthrie dated Jun. 14, 2007, Cited in attached IDS.
Declaration of Don Wilson dated Jun. 14, 2007, Cited in attached IDS.
Declaration of Madhu Gupta dated Jun. 14, 2007, Cited in attached IDS.
Declaration of Floyd Pothaven, Cited in attached IDS.
Declaration of Anthony Cooper, Cited in attached IDS.
Declaration of Greg Prior dated Jun. 15, 2007, Cited in attached IDS.
Declaration of Joe Bennett, Cited in attached IDS.
Collection of e-mails between Tim Russell and Terry Kearney, WSGR, Cited in attached IDS.
E-mail dated May 19, 2007 from Tim Russell to Guthrie's counsel, Cited in attached IDS.
Declaration of Nicola Pisano dated May 21, 2007, Cited in attached IDS.
Subpoena for Tim Russell, Not cited.
Notice of Deposition of Tim Russell, Not cited.
Draft of Charles Guthrie's May 10, 2000 expense report, Cited in attached IDS.
May 31, 2000 e-mail from David Turner to Wayne Catlett and Greg Prior, Cited in attached IDS.
Jun. 1, 2000 e-mail from David Turner to DRI re: Lamp Project Budget, Cited in attached IDS.
Jun. 2, 2000 e-mail from David Turner, Cited in attached IDS.
Jun. 26, 2000 e-mail from David Turner to DRI, Cited in attached IDS.
Jun. 28, 2000 e-mail from David Turner to Don Wilson and Charles Guthrie, Cited in attached IDS.
Transcript of Jun. 6, 2007 deposition of Tim Russell, Cited in attached IDS.
Declaration of Dennis Nunes, Cited in attached IDS.
"Decision", *Guthrie v. Espiau, Board of Patent Appeals and Interferences* (Interference No. 105,393), (Mar. 24, 2008),43 pgs.
"Judgment", *Guthrie v. Espiau, Board of Patent Appeals and Interferences* (Interference No. 105,393), (Mar. 24, 2008),3 pgs.
"First Amended Complaint", *Ceravision, Limited v. Luxim Corporation*, (Civ. Action No. C08-02575, U.S.D.C., No. District of Calif.),(Jun. 13, 2008),9 pgs.

\* cited by examiner

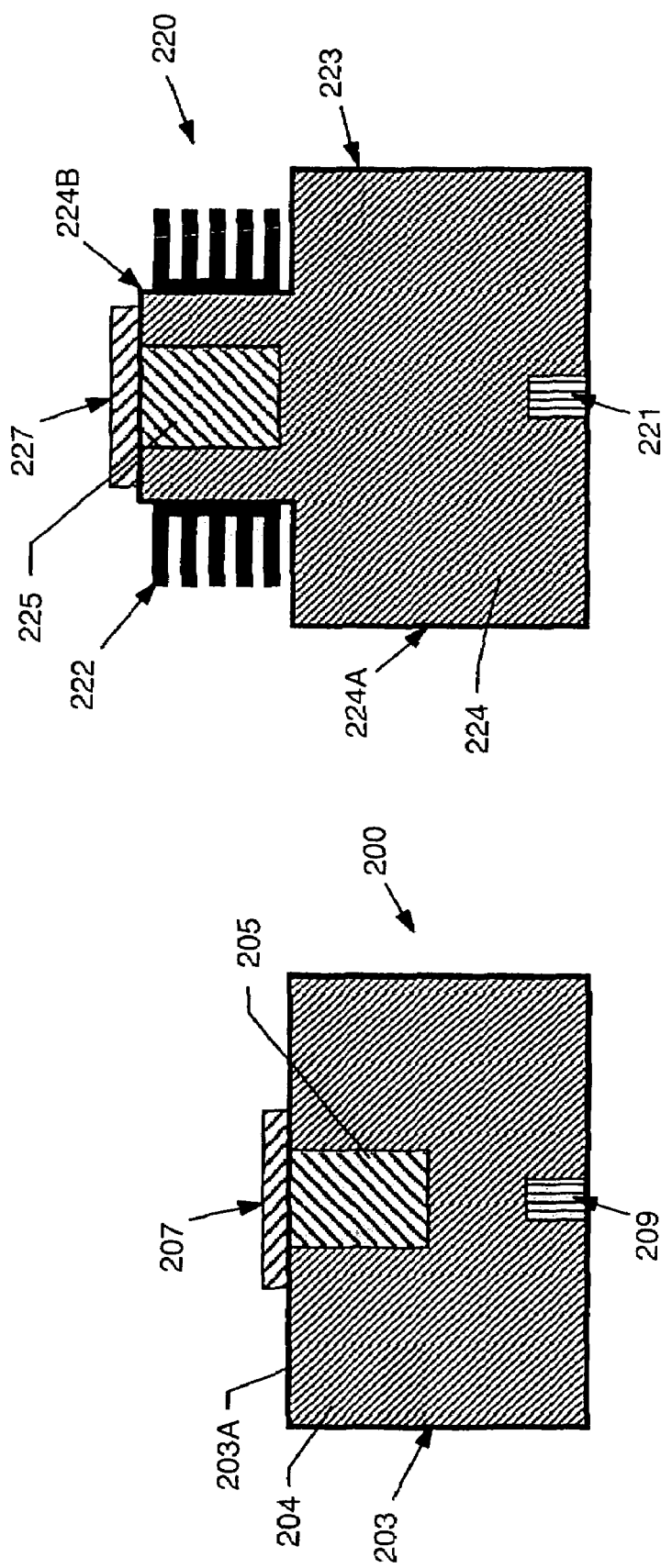

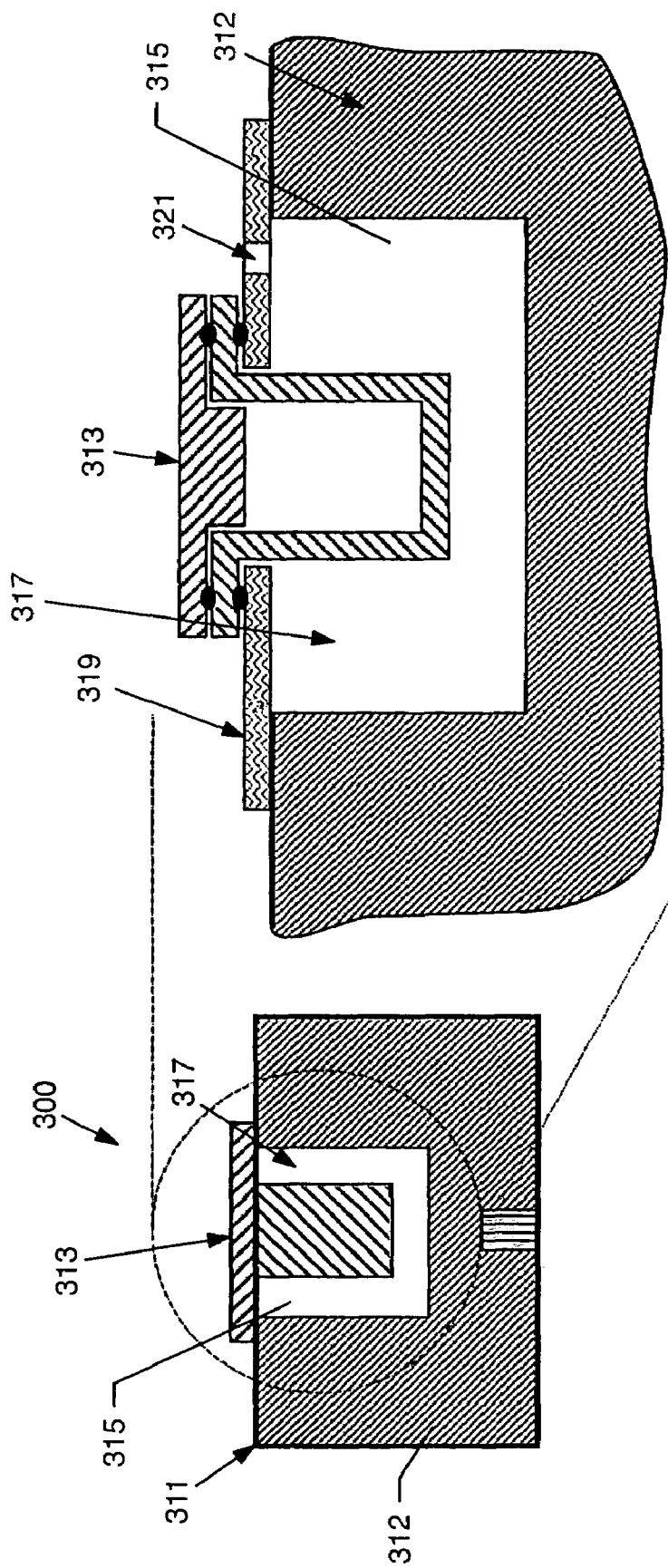

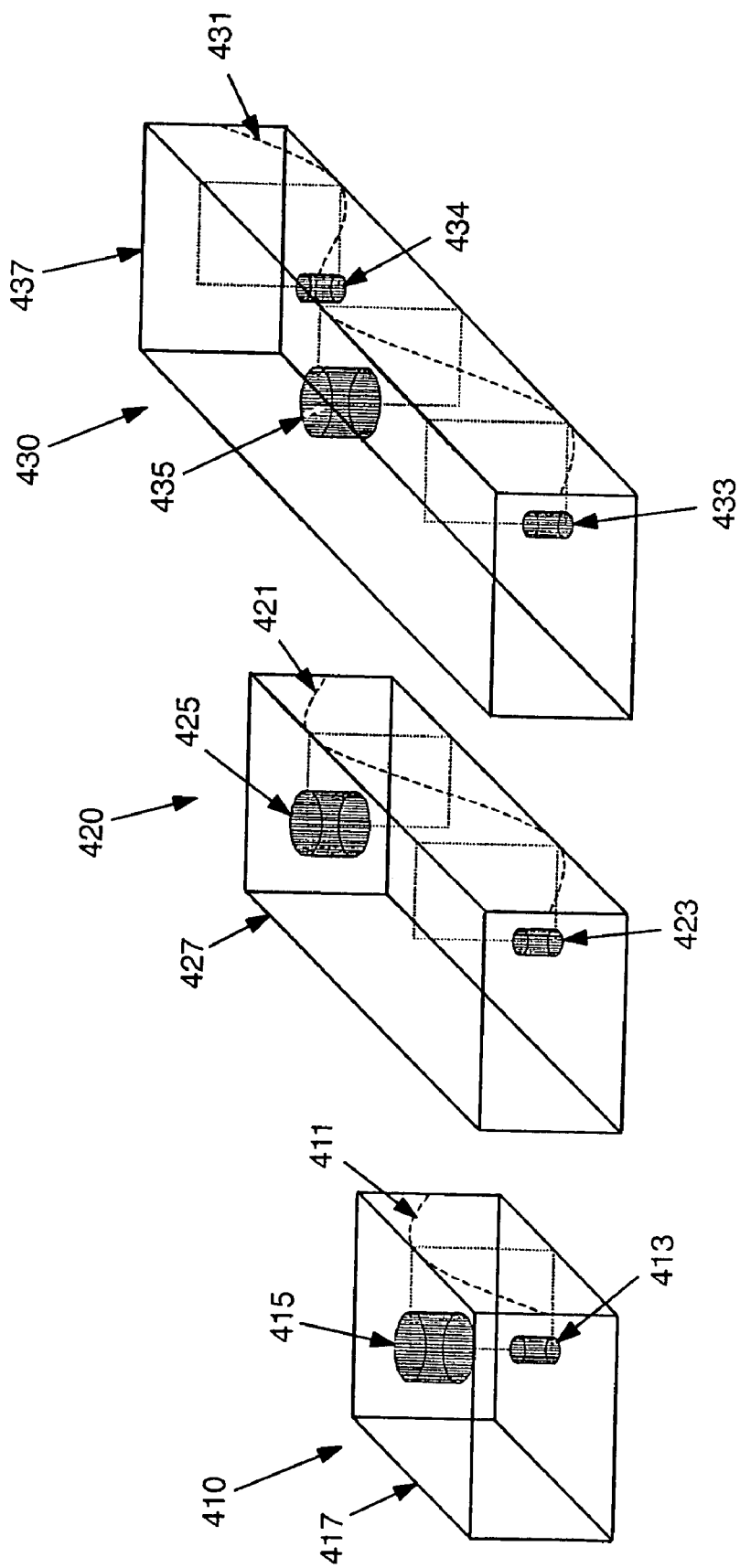

PLASMA LAMP WITH DIELECTRIC WAVEGUIDE

CROSS-REFERENCE TO RELATED APPLICATIONS

This application is a continuation of U.S. application Ser. No. 10/771,788 filed on Feb. 4, 2004, now U.S. Pat. No. 7,348,732 entitled "Plasma Lamp With Dielectric Waveguide," which is a continuation of U.S. non-provisional patent application Ser. No. 09/809,718 filed on Mar. 15, 2001, now U.S. Pat. No. 6,737,809 entitled "Plasma Lamp With Dielectric Waveguide," which claims priority to U.S. provisional application Ser. No. 60/222,028 filed on Jul. 31, 2000, entitled "Plasma Lamp" each of which is incorporated herein by reference.

BACKGROUND OF THE INVENTION

1. Field of the Invention

The field of the present invention relates to devices and methods for generating light, and more particularly to electrodeless plasma lamps.

2. Background

Electrodeless plasma lamps provide point-like, bright, white light sources. Because they do not use electrodes, electrodeless plasma lamps often have longer useful lifetimes than other lamps. Electrodeless plasma lamps in the prior art have certain common features. For example in U.S. Pat. Nos. 4,954,755 to Lynch et al., 4,975,625 to Lynch et al., 4,978,891 to Ury et al., 5,021,704 to Walter et al., 5,448,135 to Simpson, 5,594,303 to Simpson, 5,841,242 to Simpson et al., 5,910,710 to Simpson, and 6,031,333 to Simpson, each of which is incorporated herein by reference, the plasma lamps direct microwave energy into an air cavity, with the air cavity enclosing a bulb containing a mixture of substances that can ignite, form a plasma, and emit light.

The plasma lamps described in these patents are intended to provide brighter light sources with longer life and more stable spectrum than electrode lamps. However, for many applications, light sources that are brighter, smaller, less expensive, more reliable, and have long useful lifetimes are desired, but such light sources until now have been unavailable. Such applications include, for example, streetlights and emergency response vehicles. A need exists therefore, for a very bright, durable light source at low cost.

In the prior art, the air-filled cavity of the electrodeless plasma lamp is typically constructed in part by a metal mesh. Metal mesh is used because it contains the microwave energy within the cavity while at the same time permitting the maximum amount of visible light to escape. The microwave energy is typically generated by a magnetron or solid state electronics and is guided into the cavity through one or more waveguides. Once in the air-filled cavity, microwave energy of select frequencies resonates, where the actual frequencies that resonate depend upon the shape and size of the cavity. Although there is tolerance in the frequencies that may be used to power the lamps, in practice, the power sources are limited to microwave frequencies in the range of 1-10 GHz.

Because of the need to establish a resonance condition in the air-filled cavity, the cavity generally may not be smaller than one-half the wavelength of the microwave energy used to power the lamp. The air-filled cavity and thereby, the plasma lamp itself has a lower limit on its size. However, for many applications, such as for high-resolution monitors, bright lamps, and projection TVs, these sizes remain prohibitively large. A need exists therefore for a plasma lamp that is not constrained to the minimum cavity sizes illustrated by the prior art.

In the prior art, the bulbs are typically positioned at a point in the cavity where the electric field created by the microwave energy is at a maximum. The support structure for the bulb is preferably of a size and composition that does not interfere with the resonating microwaves, as any interference with the microwaves reduces the efficiency of the lamp. The bulbs, therefore, are typically made from quartz. Quartz bulbs, however, are prone to failure because the plasma temperature can be several thousand degrees centigrade, which can bring the quartz wall temperature to near 1000° C. Furthermore, quartz bulbs are unstable in terms of mechanical stability and optical and electrical properties over long periods. A need exists, therefore, for a light source that overcomes the above-described issues, but that is also stable in its spectral characteristics over long periods.

In prior art plasma lamps, the bulb typically contains a noble gas combined with a light emitter, a second element or compound which typically comprises sulfur, selenium, a compound containing sulfur or selenium, or any one of a number of metal halides. Exposing the contents of the bulb to microwave energy of high intensity causes the noble gas to become a plasma. The free electrons within the plasma excite the light emitter within the bulb. When the light emitter returns to a lower electron state, radiation is emitted. The spectrum of light emitted depends upon the characteristics of the light emitter within the bulb. Typically, the light emitter is chosen to cause emission of visible light.

Plasma lamps of the type described above frequently require high intensity microwaves to initially ignite the noble gas into plasma. However, over half of the energy used to generate and maintain the plasma is typically lost as heat, making heat dissipation a problem. Hot spots can form on the bulb causing spotting on the bulb and thereby reducing the efficiency of the lamp. Methods have been proposed to reduce the hot spots by rotating the lamp to better distribute the plasma within the lamp and by blowing constant streams of air at the lamp. These solutions, however, add structure to the lamp, thereby increasing its size and cost. Therefore, a need exists for a plasma lamp that requires less energy to ignite and maintain the plasma, and includes a minimum amount of additional structure for efficient dissipation of heat.

SUMMARY OF THE INVENTION

This invention generally provides, in one aspect, devices and methods of producing bright, spectrally stable light.

In accordance with one embodiment as described herein, a device for producing light comprises an electromagnetic energy source, a waveguide having a body formed of a dielectric material, and a bulb. Preferably, the waveguide is connected to the energy source for receiving electromagnetic energy from the energy source. The waveguide builds and contains the electromagnetic energy. The bulb, which is coupled to the waveguide, receives electromagnetic energy from the waveguide. The received electromagnetic energy ignites a gas-fill that forms a plasma and emits light, preferably in the visible spectral range.

In one preferred embodiment, the bulb is shaped to reflect light outwards through its window. The electromagnetic energy source is preferably a microwave energy source that is efficiently coupled to and preferably thermally isolated from the waveguide. Furthermore, the outer surface of the waveguide, preferably with the exception of the bulb cavity, is coated with a material to contain the microwave energy within the waveguide. The dielectric forming the waveguide preferably has a high dielectric constant, a high dielectric strength, and a low loss tangent. This permits high power densities within the waveguide. A heat sink preferably is attached to the outer surfaces of the waveguide to dissipate heat.

In accordance with a first alternative embodiment, the lamp is operated in resonant cavity mode. In this mode, the microwave energy directed into the waveguide has a frequency such that it resonates within the waveguide. The microwave feed and the bulb are preferably positioned at locations with respect to the waveguide that correspond to electric field maxima of the resonant frequency.

In accordance with a second alternative embodiment, the lamp is operated in a dielectric oscillator mode. In this mode, an energy feedback mechanism or probe is coupled to the dielectric waveguide at a point that in one embodiment corresponds to an energy maximum. The probe senses the electric field amplitude and phase within the waveguide at the point of coupling. Using the probe signal to provide feedback, the lamp may be continuously operated in resonant cavity mode, even if the resonant frequency changes as the plasma forms in the bulb and/or if the dielectric waveguide undergoes thermal expansion due to the heat generated. The probe provides feedback to the microwave source and the microwave source adjusts its output frequency to dynamically maintain a resonance state.

Further embodiments, variations and enhancements, including combinations of the above-described embodiments, or features thereof, are also described herein or depicted in the accompanying drawings.

BRIEF DESCRIPTION OF THE DRAWINGS

FIGS. 2A and 2B illustrate sectional views of alternative embodiments of a plasma lamp.

FIGS. 3A and 3B illustrate a sectional view of an alternative embodiment of a plasma lamp wherein the bulb is thermally isolated from the dielectric waveguide.

FIGS. 4A-D illustrate different resonant modes within a rectangular prism-shaped waveguide.

DETAILED DESCRIPTION OF THE PREFERRED EMBODIMENTS

Figure 1:
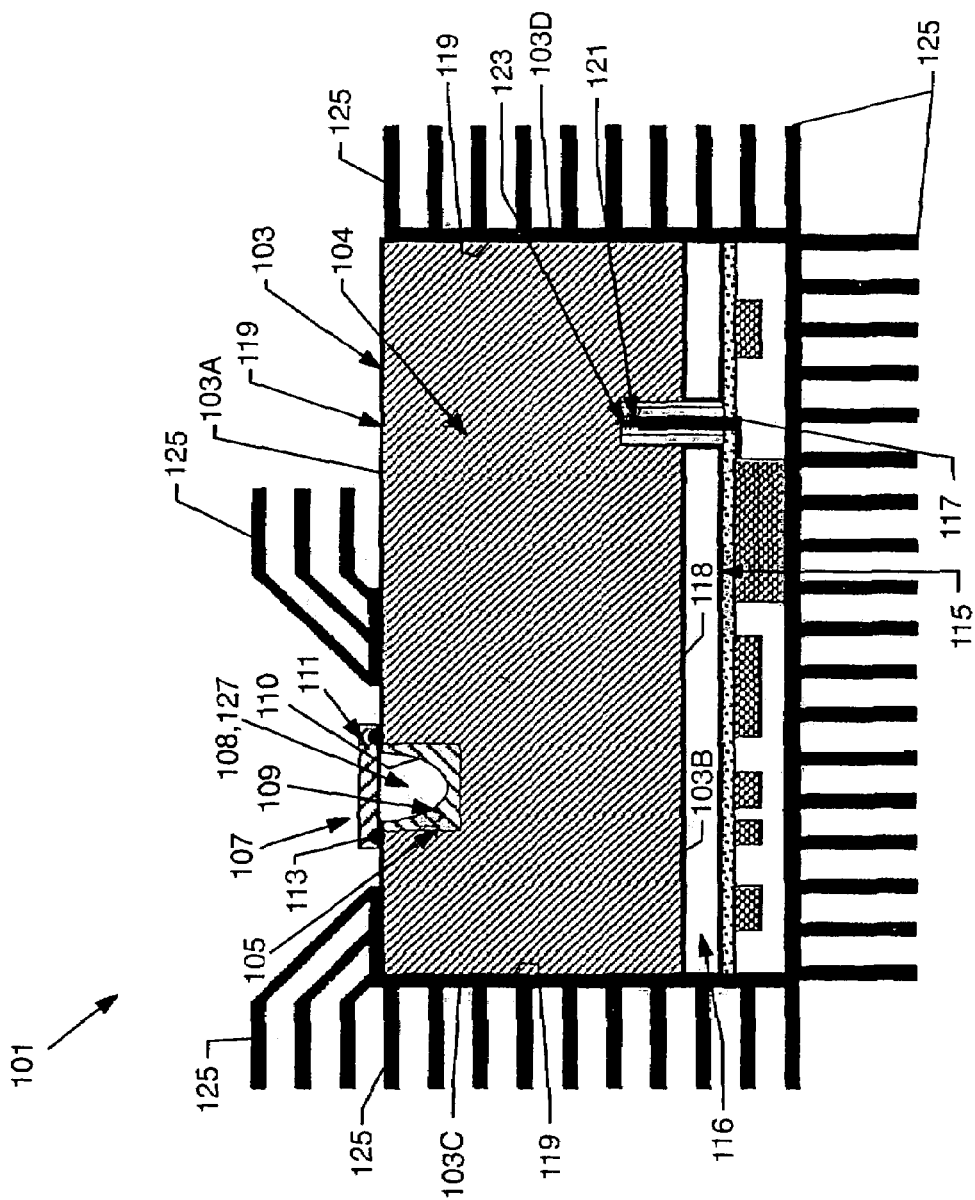
FIG. 1 illustrates a sectional view of a plasma lamp according to a preferred embodiment.

Turning now to the drawings, FIG. 1 illustrates a preferred embodiment of a dielectric waveguide integrated plasma lamp 101 (DWIPL). The DWIPL 101 preferably comprises a source 115 of electromagnetic radiation, preferably microwave radiation, a waveguide 103 having a body formed of a dielectric material, and a feed 117 coupling the radiation source 115 to the waveguide 103. As used herein, the term "waveguide" generally refers to any device having a characteristic and purpose of at least partially confining electromagnetic energy. The DWIPL 101 further includes a bulb 107, that is preferably disposed on an opposing side of the waveguide 103, and contains a gas-fill, preferably comprising a noble gas and a light emitter, which when receiving electromagnetic energy at a specific frequency and intensity forms a plasma and emits light.

In a preferred embodiment, the microwave radiation source 115 feeds the waveguide 103 microwave energy via the feed 117. The waveguide contains and guides the microwave energy to a cavity 105 preferably located on an opposing side of the waveguide 103 from the feed 117. Disposed within the cavity 105 is the bulb 107 containing the gas-fill. Microwave energy is preferably directed into the enclosed cavity 105, and in turn the bulb 107. This microwave energy generally frees electrons from their normal state and thereby transforms the noble gas into a plasma. The free electrons of the noble gas excite the light emitter. The de-excitation of the light emitter results in the emission of light. As will become apparent, the different embodiments of DWIPLs disclosed herein offer distinct advantages over the plasma lamps in the prior art, such as an ability to produce brighter and spectrally more stable light, greater energy efficiency, smaller overall lamp sizes, and longer useful life spans.

The microwave source 115 in FIG. 1 is shown schematically as solid state electronics, however, other devices commonly known in the art that can operate in the 0.5-30 GHz range may also be used as a microwave source, including but not limited to klystrons and magnetrons. The preferred range for the microwave source is from about 500 MHz to about 10 GHz.

Depending upon the heat sensitivity of the microwave source 115, the microwave source 115 may be thermally isolated from the bulb 107, which during operation preferably reaches temperatures between about 700° C. and about 1000° C. Thermal isolation of the bulb 107 from the source 115 provides a benefit of avoiding degradation of the source 115. Additional thermal isolation of the microwave source 115 may be accomplished by any one of a number of methods commonly known in the art, including but not limited to using an insulating material or vacuum gap occupying an optional space 16 between the source 115 and waveguide 103. If the latter option is chosen, appropriate microwave feeds are used to couple the microwave source 115 to the waveguide 103.

In FIG. 1, the feed 117 that transports microwaves from the source 115 to the waveguide 103 preferably comprises a coaxial probe. However, any one of several different types of microwave feeds commonly known in the art may be used, such as microstrip lines or fin line structures.

Due to mechanical and other considerations such as heat, vibration, aging, or shock, when feeding microwave signals into a dielectric material, contact between the feed 117 and the waveguide 103 is preferably maintained using a positive contact mechanism 121. The contact mechanism 121 provides constant pressure between the feed 117 and the waveguide 103 to minimize the probability that microwave energy will be reflected back through the feed 117 and not transmitted into the waveguide 103. In providing constant pressure, the contact mechanism 121 compensates for small dimensional changes in the microwave feed 117 and the waveguide 103 that may occur due to thermal heating or mechanical shock. The contact mechanism may be a spring loaded device, such as is illustrated in FIG. 1, a bellows type device, or any other device commonly known in the art that can sustain a constant pressure for continuously and steadily transferring microwave energy.

When coupling the feed 117 to the waveguide 103, intimate contact is preferably made by depositing a metallic material 123 directly on the waveguide 103 at its point of contact with the feed 117. The metallic material 123 eliminates gaps that may disturb the coupling and is preferably comprised of gold, silver, or platinum, although other conductive materials may also be used. The metallic material 123 may be deposited using any one of several methods commonly known in the art, such as depositing the metallic material 123 as a liquid and then firing it in an oven to provide a solid contact.

In FIG. 1, the waveguide 103 is preferably the shape of a rectangular prism, however, the waveguide 103 may also have a cylindrical prism shape, a sphere-like shape, or any other shape, including a complex, irregular shape the resonant frequencies of which are preferably determined through electromagnetic simulation tools, that can efficiently guide microwave energy from the feed 117 to the bulb 107. The actual dimensions of the waveguide may vary depending upon the frequency of the microwave energy used and the dielectric constant of the body of waveguide 103.

In one preferred embodiment, the waveguide body is approximately 12,500 mm$^3$ with a dielectric constant of approximately 9 and operating frequency of approximately 2.4 GHz. Waveguide bodies on this scale are significantly smaller than the waveguides in the plasma lamps of the prior art. As such, the waveguides in the preferred embodiments represent a significant advance over the prior art because the smaller size allows the waveguide to be used in many applications, where waveguide size had previously prohibited such use or made such use wholly impractical. For larger dielectric constants, even smaller sizes for the waveguides may be achieved. Besides the obvious advantages created by a reduction in size, size reduction translates into a higher power density, lower loss, and thereby, an ease in igniting the lamp.

Regardless of its shape and size, the waveguide 103 preferably has a body comprising a dielectric material which, for example, preferably exhibits the following properties: (1) a dielectric constant preferably greater than approximately 2; (2) a loss tangent preferably less than approximately 0.01; (3) a thermal shock resistance quantified by a failure temperature of preferably greater than approximately 200° C.; (4) a DC breakdown threshold of preferably greater than approximately 200 kilovolts/inch; (5) a coefficient of thermal expansion of preferably less than approximately $10^{-5}/°$ C.; (6) a zero or slightly negative temperature coefficient of the dielectric constant; (7) stoichemetric stability over a preferred range of temperature, preferably from about −80° C. to about 1000° C., and (8) a thermal conductivity of preferably approximately 2 W/mK (watts per milliKelvin).

Certain ceramics, including alumina, zirconia, titanates, and variants or combinations of these materials, and silicone oil may satisfy many of the above preferences, and may be used because of their electrical and thermo-mechanical properties. In any event, it should be noted that the embodiments presented herein are not limited to a waveguide exhibiting all or even most of the foregoing properties.

In the various embodiments of the waveguide disclosed herein, such as in the example outlined above, the waveguide preferably provides a substantial thermal mass, which aids efficient distribution and dissipation of heat and provides thermal isolation between the lamp and the microwave source.

Alternative embodiments of DWIPLS 200, 220 are depicted in FIGS. 2A-B. In FIG. 2A, a bulb 207 and bulb cavity 205 are provided on one side of a waveguide 203, preferably on a side opposite a feed 209, and more preferably in the same plane as the feed 209, where the electric field of the microwave energy is at a maximum. Where more than one maximum of the electric field is provided in the waveguide 203, the bulb 207 and bulb cavity 205 may be positioned at one maximum and the feed 209 at another maximum. By placing the feed 209 and bulb 207 at a maximum for the electric field, a maximum amount of energy is respectively transferred and intercepted. The bulb cavity 205 is a concave form in the body of the waveguide 203.

As shown in FIG. 2B, the body of the waveguide 223 optionally protrudes outwards in a convex form, from the main part of the body of the waveguide 203 to form the bulb cavity 225. As in FIG. 2A, in FIG. 2B, the bulb 227 is preferably positioned opposite to the feed 221. However, where more than one electric field maximum is provided in the waveguide 203, the bulb 207, 227 may be positioned in a plane other than the plane of the feed 209, 221.

Returning to FIG. 1, the outer surfaces of the waveguide 103, with the exception of those surfaces forming the bulb cavity 105, are preferably coated with a thin metallic coating 119 to reflect the microwaves. The overall reflectivity of the coating 119 determines the level of energy contained within the waveguide 103. The more energy that can be stored within the waveguide 103, the greater the overall efficiency of the lamp 101. The coating 119 also preferably suppresses evanescent radiation leakage. In general, the coating 119 preferably significantly eliminates any stray microwave field.

Microwave leakage from the bulb cavity 105 may be significantly attenuated by having a cavity 105 that is preferably significantly smaller than the microwave wavelengths used to operate the lamp 101. For example, the length of the diagonal for the window is preferably considerably less than half of the microwave wavelength (in free space) used.

The bulb 107 is disposed within the bulb cavity 105, and preferably comprises an outer wall 109 and a window 111. In one preferred embodiment, the cavity wall of the body of the waveguide 103 acts as the outer wall of the bulb 107. The components of the bulb 107 preferably include one or more dielectric materials, such as ceramics and sapphires. In one embodiment, the ceramics in the bulb are the same as the material used in waveguide 103. Dielectric materials are preferred for the bulb 107 because the bulb 107 is preferably surrounded by the dielectric body of the waveguide 103 and the dielectric materials help ensure efficient coupling of the microwave energy with the gas-fill in the bulb 107.

The outer wall 109 is preferably coupled to the window 111 using a seal 113, thereby defining a bulb envelope 127 which contains the gas-fill comprising the plasma-forming gas and light emitter. The plasma-forming gas is preferably a noble gas, which enables the formation of a plasma. The light emitter is preferably a vapor formed of any one of a number of elements or compounds currently known in the art, such as sulfur, selenium, a compound containing sulfur or selenium, or any one of a number of metal halides, such as indium bromide ($InBr_3$).

To assist in confining the gas-fill within the bulb 107, the seal 113 preferably comprises a hermetic seal. The outer wall 109 preferably comprises alumina because of its white color, temperature stability, low porosity, and thermal expansion coefficient. However, other materials that generally provide one or more of these properties may be used. The outer wall 109 is also preferably contoured to reflect a maximum amount of light out of the cavity 105 through the window 111. For instance, the outer wall 109 may have a parabolic contour to reflect light generated in the bulb 107 out through the window 111. However, other outer wall contours or configurations that facilitate directing light out through the window 111 may be used.

The window 111 preferably comprises sapphire for light transmittance and because its thermal expansion coefficient matches well with alumina. Other materials that have a similar light transmittance and thermal expansion coefficient may be used for the window 111. In an alternative embodiment, the window 111 may comprise a lens to collect the emitted light.

As referenced above, during operation, the bulb 107 may reach temperatures of up to about 1000° C. Under such conditions, the waveguide 103 in one embodiment acts as a heat sink for the bulb 107. By reducing the heat load and heat-induced stress upon the various components of the DWIPL 101, the useful life span of the DWIPL 101 is generally increased beyond the life span of typical electrodeless lamps. Effective heat dissipation may be obtained by preferably placing heat-sinking fins 125 around the outer surfaces of the waveguide 103, as depicted in FIG. 1. In the embodiment shown in FIG. 2B, with the cavity 225 extending away from the main part of the body of the waveguide 223, the DWIPL 220 may be used advantageously to remove heat more efficiently by placing fins 222 in closer proximity to the bulb 227.

In another embodiment, the body of the waveguide 103 comprises a dielectric, such as a titanate, which is generally not stable at high temperatures. In this embodiment, the waveguide 103 is preferably shielded from the heat generated in the bulb 107 by placing a thermal barrier between the body of the waveguide 103 and the bulb 107. In one alternative embodiment, the outer wall 109 acts as a thermal barrier by comprising a material with low thermal conductivity such as NZP. Other suitable material for a thermal barrier may also be used.

FIGS. 3A and 3B illustrate an alternative embodiment of a DWIPL 300 wherein a vacuum gap acts as a thermal barrier. As shown in FIG. 3A, the bulb 313 of the DWIPL 300 is disposed within a bulb cavity 315 and is separated from the waveguide 311 by a gap 317, the thickness of which preferably varies depending upon the microwave propagation characteristics and material strength of the material used for the body of the waveguide 311 and the bulb 313. The gap 317 is preferably a vacuum, minimizing heat transfer between the bulb 313 and the waveguide 311.

FIG. 3B illustrates a magnified view of the bulb 313, bulb cavity 315, and vacuum gap 317 for the DWIPL 300. The boundaries of the vacuum gap 317 are formed by the waveguide 311, a bulb support 319, and the bulb 313. The bulb support 319 may be sealed to the waveguide 311, the support 319 extending over the edges of the bulb cavity 315 and comprising a material such as alumina that preferably has high thermal conductivity to help dissipate heat from the bulb 313.

Embedded in the support 319 is an access seal 321 for establishing a vacuum within the gap 317 when the bulb 313 is in place. The bulb 313 is preferably supported by and hermetically sealed to the bulb support 319. Once a vacuum is established in the gap 317, heat transfers between the bulb 313 and the waveguide 311 are preferably substantially reduced.

Embodiments of the DWIPLs thus far described preferably operate at a microwave frequency in the range of 0.5-10 GHz. The operating frequency preferably excites one or more resonant modes supported by the size and shape of the waveguide, thereby establishing one or more electric field maxima within the waveguide. When used as a resonant cavity, at least one dimension of the waveguide is preferably an integer number of half-wavelengths long.

FIGS. 4A-C illustrate three alternative embodiments of DWIPLs 410, 420, 430 operating in different resonant modes. FIG. 4A illustrates a DWIPL 410 operating in a first resonant mode 411 where one axis of a rectangular prism-shaped waveguide 417 has a length that is one-half the wavelength of the microwave energy used. FIG. 4B illustrates a DWIPL 420 operating in a resonant mode 421 where one axis of a rectangular prism-shaped waveguide 427 has a length that is equal to one wavelength of the microwave energy used. FIG. 4C illustrates a DWIPL 430 operating in a resonant mode 431 where one axis of a rectangular prism-shaped waveguide 437 has a length that is 1½ wavelengths of the microwave energy used.

In each of the DWIPLs and corresponding modes depicted in FIGS. 4A-C, and for DWIPLs operating at any higher modes, the bulb cavity 415, 425, 435 and the feed(s) 413, 423, 433, 434 are preferably positioned with respect to the waveguide 417, 427, 437 at locations where the electric fields are at an operational maximum. However, the bulb cavity and the feed do not necessarily have to lie in the same plane.

FIG. 4C illustrates an additional embodiment of a DWIPL 430 wherein two feeds 433, 434 are used to supply energy to the waveguide 437. The two feeds 433, 434 may be coupled to a single microwave source or multiple sources (not shown).

Figure 4D:
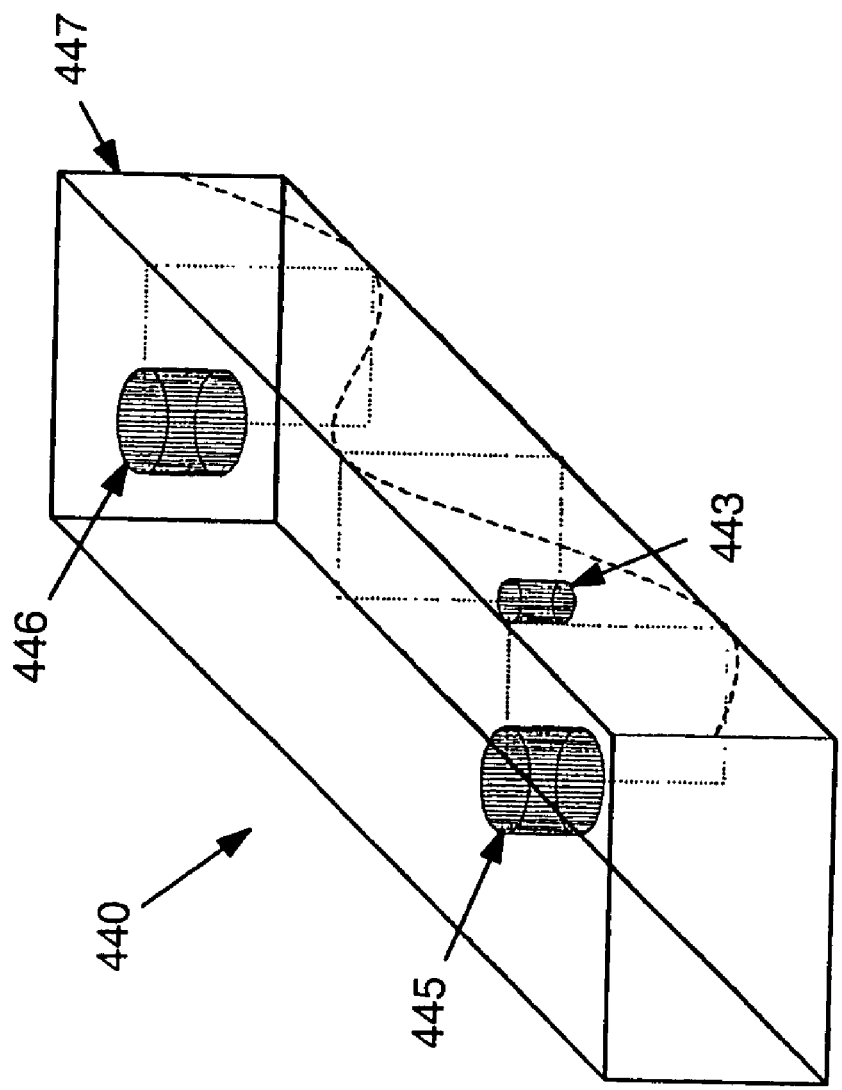

FIG. 4D illustrates another embodiment wherein a single energy feed 443 supplies energy into the waveguide 447 having multiple bulb cavities 415, 416, each positioned with respect to the waveguide 447 at locations where the electric field is at a maximum.

Figure 5C:
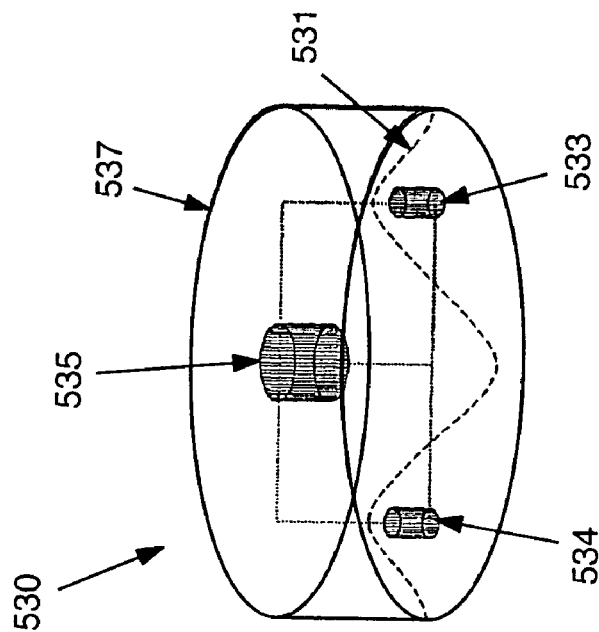
FIGS. 5A-C illustrate different resonant modes within using a cylindrical prism-shaped cylindrical waveguide.
Figure 5B:
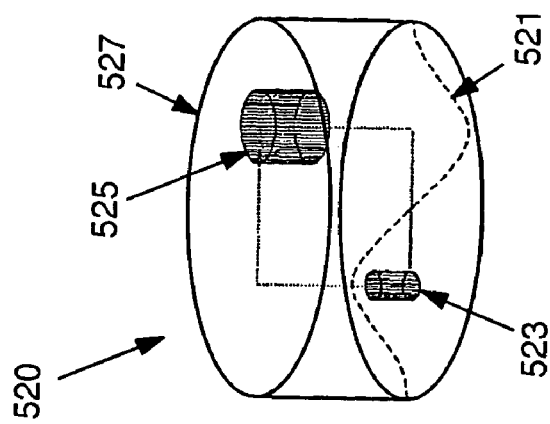
Figure 5A:
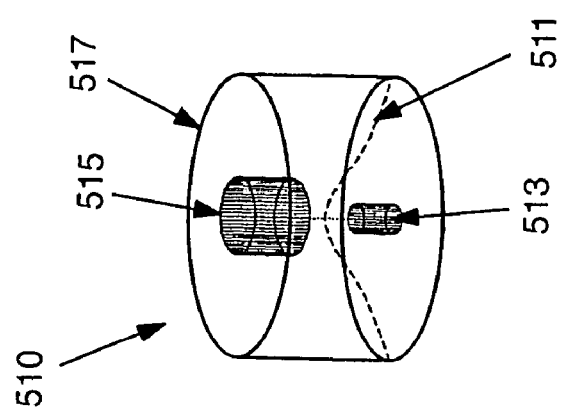

FIGS. 5A-C illustrate DWIPLs 510, 520, 530 having cylindrical prism-shaped waveguides 517, 527, 537. In the embodiments depicted in FIGS. 5A-C, the height of the cylinder is preferably less than its diameter, the diameter preferably being close to an integer multiple of the lowest order half-wavelength of energy that can resonate within the waveguide 517, 527, 537. Placing such a dimensional restriction on the cylinder results in the lowest resonant mode being independent of the height of the cylinder. The diameter of the cylinder thereby dictates the fundamental mode of the energy within the waveguide 517, 527, 537. The height of the cylinder can therefore be optimized for other requirements such as size and heat dissipation. In FIG. 5A, the feed 513 is preferably positioned directly opposite the bulb cavity 515 and the zeroeth order Bessel mode 511 is preferably excited.

Other modes may also be excited within a cylindrical prism-shaped waveguide. For example, FIG. 5B illustrates a DWIPL 520 operating in a resonant mode where the cylinder 527 has a diameter that is preferably close to one wavelength of the microwave energy used.

As another example, FIG. 5C illustrates a DWIPL 520 operating in a resonant mode where the cylinder 537 has a diameter that is preferably close to ½ wavelengths of the microwave energy used. FIG. 5C additionally illustrates an embodiment of a DWIPL 530 whereby two feeds 533, 534 are used to supply energy to the cylinder-shaped waveguide 537. As with other embodiments of the DWIPL, in a DWIPL having a cylinder-shaped waveguide, the bulb cavity 515, 525, 535 and the feed(s) 513, 523, 533, 534 are preferably positioned with respect to the waveguide 517, 527, 537 at locations where the electric field is at a maximum.

Using a dielectric waveguide has several distinct advantages. First, as discussed above, the waveguide may be used to help dissipate the heat generated in the bulb. Second, higher power densities may be achieved within a dielectric waveguide than are possible in the plasma lamps with air cavities that are currently used in the art. The energy density of a dielectric waveguide is greater, depending on the dielectric constant of the material used for the waveguide, than the energy density of an air cavity plasma lamp.

Referring back to the DWIPL 101 of FIG. 1, high resonant energy within the waveguide 103, corresponding to a high value for Q (where Q is the ratio of the operating frequency to the frequency width of the resonance) for the waveguide results in a high evanescent leakage of microwave energy into the bulb cavity 105. High leakage in the bulb cavity 105 leads to the quasi-static breakdown of the noble gas within the envelope 127, thus generating the first free electrons. The oscillating energy of the free electrons scales as $I\lambda^2$, where I is the circulating intensity of the microwave energy and $\lambda$ is the wavelength of that energy. Therefore, the higher the microwave energy, the greater is the oscillating energy of the free electrons. By making the oscillating energy greater than the ionization potential of the gas, electron-neutral collisions result in efficient build-up of plasma density.

Once the plasma is formed in the DWIPL and the incoming power is absorbed, the waveguide's Q value drops due to the conductivity and absorption properties of the plasma. The drop in the Q value is generally due to a change in the impedance of the waveguide. After plasma formation, the presence of the plasma in the cavity makes the bulb cavity absorptive to the resonant energy, thus changing the overall impedance of the waveguide. This change in impedance is effectively a reduction in the overall reflectivity of the waveguide. Therefore, by matching the reflectivity of the feed close to the reduced reflectivity of the waveguide, a sufficiently high Q value may be obtained even after the plasma formation to sustain the plasma. Consequently, a relatively low net reflection back into the energy source may be realized.

Much of the energy absorbed by the plasma eventually appears as heat, such that the temperature of the lamp may approach 1000° C. When the waveguide is also used as a heat sink, as previously described, the dimensions of the waveguide may change due to its coefficient of thermal expansion. Under such circumstances, when the waveguide expands, the microwave frequency that resonates within the waveguide changes and resonance is lost. In order for resonance to be maintained, the waveguide preferably has at least one dimension equal to an integer multiple of the half wavelength microwave frequency being generated by the microwave source.

One preferred embodiment of a DWIPL that compensates for this change in dimensions employs a waveguide comprising a dielectric material having a temperature coefficient for the refractive index that is approximately equal and opposite in sign to its temperature coefficient for thermal expansion. Using such a material, a change in dimensions due to thermal heating offsets the change in refractive index, minimizing the potential that the resonant mode of the cavity would be interrupted. Such materials include Titanates. A second embodiment that compensates for dimensional changes due to heat comprises physically tapering the walls of the waveguide in a predetermined manner.

Figure 6:
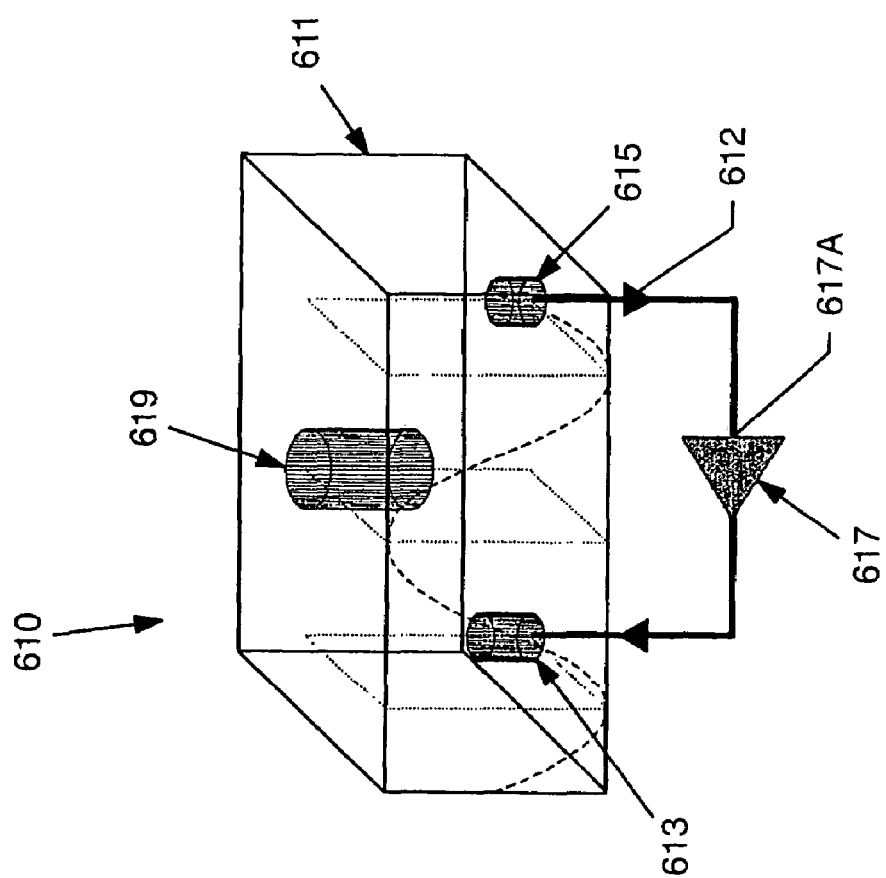
FIG. 6 illustrates an embodiment of the apparatus using a feedback mechanism to provide feedback to the microwave source to maintain a resonant mode of operation.

In another preferred embodiment, schematically shown in FIG. 6, a DWIPL 610 may be operated in a dielectric resonant oscillator mode. In this mode, first and second microwave feeds 613, 615 are coupled between the dielectric waveguide 611, which may be of any shape previously discussed, and the microwave energy source 617. The energy source 617 is preferably broadband with a high gain and high power output and capable of driving plasma to emission.

The first feed 613 may generally operate as described above in other embodiments. The second feed 615 may probe the waveguide 611 to sample the field (including the amplitude and phase information contained therein) present and provide its sample as feedback to an input of the energy source 617 or amplifier. In probing the waveguide 611, the second feed 615 also preferably acts to filter out stray frequencies, leaving only the resonant frequency within the waveguide 611.

In this embodiment, the first feed 613, second feed, 615 and bulb cavity 619 are each preferably positioned with respect to the waveguide 611 at locations where the electric field is at a maximum. Using the second feed 615, the energy source 617 amplifies the resonant energy within the waveguide 611. The source 617 thereby adjusts the frequency of its output to maintain one or more resonant modes in the waveguide 611. The complete configuration thus forms a resonant oscillator. In this manner, automatic compensation may be realized for frequency shifts due to plasma formation and thermal changes in dimension and the dielectric constant.

The dielectric resonant oscillator mode also enables the DWIPL 610 to have an immediate re-strike capability after being turned off. As previously discussed, the resonant frequency of the waveguide 611 may change due to thermal expansion or changes in the dielectric constant caused by heat generated during operation. When the DWIPL 610 is shutdown, heat is slowly dissipated, causing instantaneous changes in the resonant frequency of the waveguide 611.

However, as indicated above, in the resonant oscillator mode the energy source 617 automatically compensates for changes in the resonant frequency of the waveguide 611. Therefore, regardless of the startup characteristics of the waveguide 611, and providing that the energy source 617 has the requisite bandwidth, the energy source 617 will automatically compensate to achieve resonance within the waveguide 611. The energy source immediately provides power to the DWIPL at the optimum plasma-forming frequency.

While embodiments and advantages of this invention have been shown and described, it would be apparent to those skilled in the art that many more modifications are possible without departing from the inventive concepts herein. The invention, therefore, is not to be restricted except in the spirit of the appended claims.

What is claimed is:

1. A plasma lamp comprising:
    a waveguide body having a dielectric constant greater than about 2;
    an RF source including an input and an output, the output coupled to the waveguide body at a first location to provide RF energy to the waveguide body;
    the input of the RF source coupled to the waveguide body at a second location to obtain feedback from the waveguide body; and
    a bulb adjacent to the waveguide body, the bulb containing a gas that forms a plasma when the RF energy is applied to the waveguide body through the first feed.

2. The plasma lamp of claim 1, wherein the RF source uses the feedback to adjust the frequency of the RF energy applied to the waveguide body to maintain at least one resonant mode.

3. The plasma lamp guide of claim 1, wherein a cavity is formed in the dielectric waveguide body and the bulb comprises the cavity and a window.

4. The plasma lamp of claim 1, wherein a cavity is formed in the dielectric waveguide and the bulb is positioned in the cavity.

5. The plasma lamp of claim 1, wherein the RF source is configured to use the feedback to provide an immediate re-strike capability when the plasma is extinguished.

6. The plasma lamp of claim 1 further comprising an amplifier coupled to the RF source and the waveguide body to provide the feedback.

7. The plasma of claim 2 wherein, the first location is at a resonant field maximum.

8. The plasma of claim 2, wherein the bulb is positioned at a resonant field maximum.

9. A plasma lamp comprising:
    a waveguide body having a dielectric constant greater than about 2;
    a first feed coupled to the waveguide body to provide RF energy to the waveguide body;

a second feed coupled to the waveguide body to obtain feedback from the waveguide body; and a bulb adjacent to the waveguide body, the bulb containing a gas that forms a plasma when the RF energy is applied to the waveguide body through the first feed.

10. The plasma lamp guide of claim 9, wherein the first feed is embedded within the waveguide body.

11. The plasma lamp of claim 9, wherein the second feed is embedded within the waveguide body.

12. The plasma lamp of claim 9, further comprising an amplifier coupled to the second feed.

13. The plasma lamp of claim 9, wherein the waveguide body is configured to resonate when the RF energy is applied to the waveguide body.

14. The plasma lamp of claim 13, wherein the first feed is positioned at a resonant field maximum.

15. The plasma lamp of claim 13, wherein the bulb is positioned at a resonant field maximum.

16. The plasma lamp of claim 15, wherein the first feed is positioned at a different resonant field maximum.

* * * * *